(12) United States Patent
Paun et al.

(10) Patent No.: US 11,725,358 B2
(45) Date of Patent: Aug. 15, 2023

(54) ROTARY DRIVE MACHINE FOR HELICAL PILE INSTALLATION AND METHOD OF USE

(71) Applicants: Terry Paun, Regina (CA); Rebecca Paun, Regina (CA)

(72) Inventors: Terry Paun, Regina (CA); Rebecca Paun, Regina (CA)

(*) Notice: Subject to any disclaimer, the term of this patent is extended or adjusted under 35 U.S.C. 154(b) by 0 days.

(21) Appl. No.: 17/497,898

(22) Filed: Oct. 9, 2021

(65) Prior Publication Data

US 2022/0243417 A1    Aug. 4, 2022

(30) Foreign Application Priority Data

Feb. 1, 2021   (CA) ................................ CA 3107581

(51) Int. Cl.
| | | |
|---|---|---|
| *E02D 5/56* | (2006.01) | |
| *E02D 7/16* | (2006.01) | |
| *E02D 13/04* | (2006.01) | |
| *E02D 27/48* | (2006.01) | |
| *E02D 37/00* | (2006.01) | |
| *E02D 13/02* | (2006.01) | |

(52) U.S. Cl.
CPC ................ *E02D 5/56* (2013.01); *E02D 7/16* (2013.01); *E02D 13/02* (2013.01); *E02D 13/04* (2013.01); *E02D 27/48* (2013.01); *E02D 37/00* (2013.01); *E02D 2200/1671* (2013.01); *E02D 2600/20* (2013.01)

(58) Field of Classification Search
CPC .... E02D 7/02; E02D 7/06; E02D 7/22; E02D 13/04; E02D 27/48; E02D 35/00; E02D 35/005; E02D 5/56; E02D 7/16; E02D 37/00
See application file for complete search history.

(56) References Cited

U.S. PATENT DOCUMENTS

| | | | | |
|---|---|---|---|---|
| 5,004,375 A | * | 4/1991 | Lee ......................... | E02D 35/00 405/230 |
| 7,967,531 B2 | * | 6/2011 | Collina .................... | E04G 23/06 405/230 |
| 2009/0142140 A1 | * | 6/2009 | Collina .................. | E04G 23/065 405/230 |
| 2012/0308308 A1 | * | 12/2012 | Stewart .................... | E02D 27/00 405/229 |

(Continued)

FOREIGN PATENT DOCUMENTS

| | | | |
|---|---|---|---|
| CN | 106677179 A | * | 5/2017 |
| CN | 105780776 B | * | 10/2017 |
| CN | 107447761 A | * | 12/2017 |

(Continued)

*Primary Examiner* — Frederick L Lagman
(74) *Attorney, Agent, or Firm* — Stephen M. De Klerk

(57) ABSTRACT

A rotary drive machine for the installation of helical pile sections through installation openings in a slab floor inside of a building perimeter. A vertical frame having an upper end and an open lower end is positioned over an installation opening through which it is desired to rotationally install a helical pile section, and the vertical frame anchored to the slab floor. A rotary power means, attached to the helical pile section moves along a vertical movement guide and is driven by a vertical actuator to rotationally and vertically drive the helical section into the ground. A method of use is also disclosed.

21 Claims, 12 Drawing Sheets

(56) References Cited

U.S. PATENT DOCUMENTS

2020/0149241 A1* 5/2020 Flanigan .................. E02D 7/22

FOREIGN PATENT DOCUMENTS

| CN | 108951621 | A | * | 12/2018 | | |
|---|---|---|---|---|---|---|
| CN | 112095598 | A | * | 12/2020 | | |
| CN | 113174952 | A | * | 7/2021 | | |
| CN | 113481991 | A | * | 10/2021 | | |
| KR | 20140147247 | A | * | 12/2014 | | |
| KR | 101494260 | B1 | * | 2/2015 | | |
| KR | 20180112907 | A | * | 10/2018 | | |
| WO | WO-9600326 | A1 | * | 1/1996 | ............... | E02D 7/26 |

* cited by examiner

ROTARY DRIVE MACHINE FOR HELICAL PILE INSTALLATION AND METHOD OF USE

CROSS REFERENCE TO RELATED APPLICATIONS

This application claims priority to Canadian Patent Application No. 3,107,581 filed Feb. 1, 2021, which is hereby incorporated by reference herein in its entirety.

FIELD

The present disclosure relates generally to the field of foundation repair equipment and methods and more specifically provides a new apparatus and method for the installation of helical screw piles in proximity to the inside of building foundations.

BACKGROUND

As buildings age and settle there is sometimes a need to reinforce the pilings installed beneath building foundations to aid in the leveling or support of the buildings before further settlement should take place. Settlement of foundations requiring remedial piling installations or foundation support is caused by age as well as by poor or deteriorated ground stability, severe or cycles of weather related events such as freezing, thawing, flooding/wet ground, drought/dry ground and other similar severe weather or environmental events.

In the prior art, there are several methods that have been used to lift and repair settled building foundations. At present these all entail externally accessing the foundation of the building by digging a substantial trench around the outside of the building foundation, and underneath of the building foundation in order to enable access for the installation of heavy mechanical lifting equipment such as, for example, screw jacks and helical piles. Unfortunately, the excavation and movement of large amounts of soil for digging a trench around the outside of the foundation causes a substantial disturbance of the area surrounding the building. Furthermore, handling of the heavy lifting equipment beneath the building foundation is laborious and hazardous. These drawbacks of the prior art methods make the lifting of building foundations impossible and/or too expensive in many situations.

In the case of commercial or residential applications or subterranean foundations where it was not possible to gain exterior access to the foundation without causing substantial site disturbance, it would be desirable to come up with a method which could allow for the remediation or support of the foundation from inside the perimeter, if that can be done without the need for substantial site disturbance. If it were possible to install helical piles for example from inside the perimeter of a foundation in a streamlined fashion, this would allow for rapid support of the foundation and remove the need for exterior site disturbance.

One of the issues associated with the installation of helical piles, which are desirable method of foundation support, from the interior of a foundation perimeter is that the equipment required to install the helical piles is typically bulky and heavy, and unable of easy manipulation of movement into position and for example a residential basement or the like. If it was possible to provide helical pile installation equipment and methods that could use equipment that was more easily manipulated into installation position within the perimeter of the foundation, this would be widely accepted.

SUMMARY

The present disclosure comprises a rotary drive machine for the installation of helical piles, installing same through installation openings in the slab floor poured inside of the perimeter of a building foundation. As will be understood, a machine for the installation of helical piles or helical pile sections in the case of multisectional helical piles is required to effectively hold the helical pile section in an approximately vertical position—although in many cases somewhat off of a completely vertical orientation to the ground surface—while rotating the helical pile, effectively "screwing" it into position in the ground.

Insofar as a helical pile section needs to be maintained in approximate vertical orientation while installed, the first component of the machine of the present disclosure is a vertically oriented frame having an upper end and an open lower end, for positioning over an installation opening having a perimeter in the slab floor inside of the perimeter of the building foundation. It is specifically contemplated that the installation opening might be cut through the slab floor in close proximity to the foundation itself where it is desired to drive a helical pile section into the ground beneath the outer foundation of the building, although it will be understood that the system and method of the present disclosure can be employed in relation to any installation opening in any location in a floor slab.

The open lower end of the vertical frame needs to be of sufficient shape and size to permit the descension of the helical pile section through the open lower end thereof as it is driven into position in the ground exposed below the installation opening. As will be understood with respect to the remainder of the machine and the components outlined above, the vertical frame would need to be of sufficient height to accommodate the manipulation of the helical pile section to be installed in the position within the frame before the commencement of the rotary drive. At least one side of the frame is substantially open for this purpose.

A rotary power means capable of attachment to the helical pile section, and for use in the rotation installation of the helical pile section through the open lower end of the frame is slidably attached to a vertical movement guide component of the machine, in relation to the vertical frame. The vertical movement guide will allow for retention and guidance of the rotary power means therealong and in relation to the remainder of the frame. The rotary drive will comprise a hydraulic motor or some similar rotary drive device, capable of rotating the helical pile. The rotary drive will include attachment means for attachment of the helical pile section to the rotary drive mechanism for the application of rotary installation force or retraction force thereto.

A vertical actuator connects the rotary power means to the vertical frame and is attached in proximity to the upper end of the vertical frame and to the rotary power means such that the vertical actuator can provide power to movement of the rotary power means along the vertical movement guide as desired. Effectively, the vertical actuator will drive the rotary power means downward towards the ground surface as the rotary power means is actuated to rotate the helical pile into installation. The vertical actuator may comprise an actuator, such as a linear actuator, such as a hydraulic linear actuator or an electric linear actuator. The vertical actuator may include, for example, a hydraulic ram or a hydraulic motor driven pinion adapted to travel along a mating linear gear (rack) or cog strip. The gears may be straight gears, helical gears or other mating arrangements.

The vertical frame will also include at least one slab anchor for engaging and retaining the vertical frame and the open lower end thereof in relation to the installation opening, at a desired operating position for the machine. Effectively the intention of the at least one slab anchor is to anchor the vertical frame and position in relation to the slab, and in relation to the perimeter of the installation opening, to hold the machine and position while a helical pile section is installed.

The machine will be used to install helical pile sections by first positioning the machine over an installation opening in the slab and engaging the at least one slab anchor to anchor the open lower end of the machine to the slab in relation to the perimeter of the installation opening. A helical pile section will be loaded into the inside of the frame and attached to the rotary power means, with the lower end of the helical pile section being positioned in contact with the exposed ground beneath the installation opening in the slab.

Next the rotary power means will be actuated to apply rotary motion to the helical pile section, resulting in the driving of the helical pile section into the ground exposed beneath the slab at the installation opening. In conjunction with actuation of the rotary power means, the vertical actuator will also as required be actuated to push the rotary power means along the vertical movement guide, to drive the helical pile section with a downward pressure motion as it is rotated by the rotary power means. The at least one slab anchor will retain the frame of the machine and position in relation to the slab and the installation opening while the vertical pressure and vertical movement with a downward pressure motion is applied to the rotating helical pile section by the vertical actuator.

Once the helical pile sections installed to the desired depth/height the rotary power means can be detached from the helical pile section and retracted to the top of the vertical movement guide, allowing for the removal of the machine from the installation opening by releasing the at least one slab anchor from the perimeter thereof. In certain cases where a multi-section helical pile is to be installed, the rotary power means can be detached from an installed helical pile section and retracted to the top of the vertical movement guide allowing for the attachment of another helical pile section to the top of the installed section, and the reattachment of the rotary power means to the top thereof for further rotational installation.

The rotary drive machine of the present disclosure could also comprise a hydraulic drive such as a hydraulic pump to operate the various power components thereof. Where a hydraulic pump was included, the vertical actuator could comprise a hydraulic cylinder powered by the hydraulic drive, and similarly the rotary power means could be a hydraulically powered motor capable of applying rotary power to the helical pile section. In other embodiments of the machine of the present disclosure, different types of rotary or vertical power devices which may or may not be hydraulically driven can also be used and will be understood to those skilled in the art of design of machines of this nature and all such modifications are contemplated within the scope of the present disclosure.

The open nature of the frame outside of corner columns and the internally attached components such as the vertical movement guide allows for relatively easy access to components and helical pile sections located therein during operation of the machine. At least one side of the frame at the open lower end might be completely open, to further simplify the manipulation of pile sections therein and into the frame, as well as to permit more/greater angled installation options.

Certain embodiments of the machine of the present disclosure could also comprise powered machine movement means, which could be used to move and manipulate the machine in between operating positions. Given the anticipated weight of the machine, it is contemplated that machine movement means would be desirable to allow for rapid and streamlined movement of the machine on the slab surface. Various types of machine movement means could be used to permit the manipulation of the machine on the slab surface. Where a hydraulic pump is otherwise installed on the machine for the purpose of operation of the vertical and rotary power components, the hydraulic pump could also be used as required to actuate the machine movement means.

The machine movement means might be at least one powered track attached to the remainder of the machine which allowed for tracked movement thereof. The at least one powered track could be hydraulically powered, or could have other motors or means of locomotion, for example electricity or battery power.

The at least one powered track in some embodiments could be pivotally attached in proximity to the open lower end of the vertical frame, so that the machine could be laid down onto the at least one hydraulically powered track assembly and moved in an approximately horizontal position rather than while standing up. A powered track assembly attached in this nature, permitting the approximately horizontal movement of the machine, could be a climbing track assembly which would render it capable of moving the machine up and down stairs into for example basement foundation locations where it was desired to install helical piles with the machine. Powered track assemblies which can be used for climbing stairs and carrying a load such as this machine up and down stairs, ramps or other incline services will be understood to those skilled in the art and all such types of powered track or other drive assemblies capable of this type of a movement are contemplated within the scope of the present disclosure.

A powered track assembly or other movement means could be removable, or could be permanently attached, depending upon the desired use and size of the assembly and the machine—for example in certain cases a powered track assembly capable of climbing stairs or other incline surfaces might be useful for manipulating the machine downstairs or into a general operating area but if the proximity to walls or other impediments is close in the operating area it may be necessary to remove the powered track assembly once the machine is in the general area, to permit its manual movement into operating positions etc. Removable or permanently attached movement means are both contemplated within the scope of the present disclosure.

The at least one slab anchor has the purpose of retaining the machine position in relation to the perimeter of an installation opening through which a helical pile will be installed. The at least one slab anchor will temporarily anchor the machine to the slab such that it will retain its position during operation of the machine and pile installation and will permit the vertical actuator to exert vertical pressure on the rotary power means and the helical pile section attached thereto without movement of the machine up from the slab surface. Many types of slab anchors will be understood to be within the intention of the present disclosure—anything capable of engaging the perimeter of the installation opening for the purpose of retaining the machine and position is contemplated within the scope of the present disclosure. For example, it is explicitly contemplated that the slab anchors might comprise an anchoring tab attached to a threaded rod extending downwards from a corresponding threaded collar fixedly attached to the lower end of the frame. The threaded rod could be extended to lower the anchoring tab below the bottom of the slab inside of the installation opening and could then be rotated into position beneath the installation opening perimeter before tightening of the threaded rod to retain the lower end of the frame in temporary fixed attachment to the slab and in relation to the outer perimeter of the installation opening. Various numbers and types of slab anchors could be used and all are contemplated within the scope of the present disclosure.

The machine of the present disclosure might be capable of direct downward vertical driving motion to be applied to a helical pile section, driving the helical pile directly and vertically downwards from the frame, or in other embodiments, the vertical movement guide could be angled in relation to the vertical axis of the frame permanently, or optionally, such that helical pile section as installed will be installed towards one edge of the open bottom end of the frame allowing the installation of helical pile sections by the machine underneath foundation or slab portions adjacent to an edge of the installation opening. This would be particularly important where it was desired to effectively drive a helical pile into the ground directly beneath the foundation of the building, which was in proximity to an installation opening cut through the slab next to the foundation. In certain embodiments of the machine of the present disclosure, the vertical movement guide might even be capable of separate powered adjustment in terms of an angle, if it was desired to be able to adjust the angle on an ongoing basis, for example using additional hydraulic cylinders or other mechanical assistance.

In addition to the rotary drive machine of the present disclosure there is disclosed a method for installation of helical piles from the interior of the building foundation having a slab floor therein with an installation opening in the slab, exposing an installation area of the ground thereunder in close proximity to the desired installation location for a helical pile. The method comprises using a rotary drive machine such as is disclosed above and any embodiment of the rotary drive machine of the present disclosure to install helical pile by first manipulating the open bottom end of the frame of the machine into position over top of the installation opening in the slab. Following the manipulation of the open bottom end of the frame into the appropriate position, the machine will be anchored to the outer perimeter of the installation opening using the at least one slab anchor.

Following the anchoring of the machine in relation to the outer perimeter of the installation opening a helical pile section will be positioned within the frame, engaging the point on the ground there beneath that which it is desired to install the helical pile section and the upper end of the helical pile section will be attached temporarily to the rotary power means.

The rotary power means will be actuated to rotate the helical pile section and effectively screw it into the ground, while using the vertical actuator is required to drive the rotary power means and the helical pile section into the ground along the vertical movement guide. Once the helical pile section is completely rotationally installed into the ground beneath the slab, the rotary power means will be detached to therefrom, and the machine can be retracted and removed from the installation opening.

The method in certain cases can also further comprise the cutting of an installation opening in the slab floor in advance of the anchoring and positioning of the machine for installation of the helical pile.

Where a multi-section helical pile is to be installed, the method can further comprise resetting the machine for multiple sections during installation of the overall pile by detaching the rotary power means from the top end of the first helical pile section having been driven into the ground close to the ground surface, retracting the rotary power means near the upper end of the frame along the vertical movement guide using the vertical actuator before placing another helical pile section into the frame and attaching the bottom of the helical pile section to the top of the section exposed and already installed in the ground.

The rotary power means can then be attached to the top end of the supplemental helical pile section having been attached and actuated along with the vertical actuator is required to apply additional rotary motion to the combined multisection helical pile and to continue driving the supplemental helical pile section down into the ground.

Where the machine used in the method of the present disclosure further comprises powered machine movement means, the method can also comprise manipulating the machine into position over an installation opening before the installation of a helical pile section.

The rotary drive machine of the present disclosure, including the vertical frame with a vertical movement guide capable of retaining and guiding rotary power means, with the assistance of the vertical actuator, coupled with slab anchors to hold the machine position in relation to the outer perimeter of an installation opening is the key aspect of the present disclosure. Incorporating a powered track assembly or similar means of locomotion to the device, allowing for its streamlined movement up and down inclined surfaces, stairwells and the like is a further enhancement to the method of the present disclosure allowing for a further streamlined and enhanced means of rapid installation of multiple helical piles underneath the foundation of a building, and allowing for their installation from inside the perimeter of the foundation with minimal interior disturbance and no need for external disturbance of the location around the foundation.

In one aspect, the present disclosure provides a rotary drive machine for the installation of helical piles from inside a perimeter of a building foundation having a slab floor therein, said machine comprising: a vertical frame having an upper end and an open lower end for positioning over an installation opening in the slab floor through which an installation section of ground in which it is desired to rotationally install at least one helical pile section is exposed; a rotary power means for the rotation and installation of the at least one helical pile section through the open lower end of the frame; a vertical movement guide slidably engaging the rotary power means, to allow for retention and guidance of the rotary power means therealong; a vertical actuator operatively attached to the rotary power means, capable of powered movement of the rotary power means along the vertical movement guide as desired; and at least one slab anchor for engaging and retaining the vertical frame and the lower end thereof in relation to the installation opening in the slab flow exposing the installation section of ground thereunder, at a desired operating position for the machine; wherein the at least one helical pile section can be installed with the machine by: positioning the machine over the installation opening in the slab floor; anchoring the open lower end of the machine to the slab floor over the installation opening using the at least one slab anchor; inserting the at least one helical pile section to be rotationally installed inside of the frame and attaching an upper end of the at least one helical pile section to the rotary power means; actuating the rotary power means to apply a rotary motion to the at least one helical pile section for driving into the ground beneath the slab floor at the installation opening; and actuating the vertical actuator to push the rotary power means along the vertical movement guide and to drive the at least one helical pile section with a downward pressure motion as it is rotated by the rotary power means.

In an embodiment disclosed, the rotary power means and/or the vertical actuator are hydraulic.

In an embodiment disclosed, the rotary power means and/or the vertical actuator comprise a hydraulic motor.

In an embodiment disclosed, the vertical actuator comprises a rack and pinion, wherein the rack is operatively connected with the frame and the pinion is operatively connected with the rotary power means, and wherein the pinion is driven by a hydraulic motor.

In an embodiment disclosed, the vertical actuator comprises a threaded rod and mating threaded collar, wherein the threaded rod is operatively connected with the frame and the mating threaded collar is operatively connected with the rotary power means, and wherein the threaded rod and/or the mating threaded collar is driven by a hydraulic motor.

In an embodiment disclosed, the vertical actuator comprises a hydraulic actuator, wherein the hydraulic actuator is operatively connected between the frame and the rotary power means.

In an embodiment disclosed, the at least one slab anchor comprises at least one detachable anchoring tab extendable from the open lower end of the frame to reach underneath the exterior perimeter of the installation opening in the slab floor, whereby the attachment of said at least one slab anchor will retain the machine in relation to the installation opening in the slab floor and permit downward pressure to be asserted on the rotary power means by the vertical actuator in operation of the machine.

In an embodiment disclosed, the at least one slab anchor comprises a hydraulic ram to retract and/or extend the anchoring tab.

In an embodiment disclosed, the at least one slab anchor comprises a threaded rod and mating threaded collar to retract and/or extend the anchoring tab In an embodiment disclosed, the at least one slab anchor comprises at least two anchor bearings extending from the open lower end of the frame, adapted to engage the exterior perimeter of the installation opening in the slab floor and restrain the frame from rotating relative to the slab floor.

In an embodiment disclosed, the rotary drive machine further comprises at least one foundation anchor operably connected with the frame.

In an embodiment disclosed, the vertical movement guide is set at an angle relative to the vertical axis of the frame between about 0 degrees and about ±15 degrees.

In an embodiment disclosed, an angle of the vertical movement guide is adjustable.

In an embodiment disclosed, the rotary drive machine further comprises powered machine movement means, adapted to move and/or manipulate the machine into the building, between operating positions, over the installation opening, and/or out of the building.

In an embodiment disclosed, the powered machine movement means comprises at least one powered continuous track.

In an embodiment disclosed, the at least one powered continuous track is pivotally attached in proximity to the open lower end of the vertical frame, wherein the machine is movable between a transport position, laid down proximate the powered continuous track and an operating position, substantially vertical and in-between said positions.

In an embodiment disclosed, the rotary drive machine further comprises a linear actuator extending between a chassis of the powered continuous track and the vertical frame to selectively adjust the angle there-between.

In a further aspect, the present disclosure provides a method for installation of a helical pile from an interior of a building foundation having a slab floor therein with an installation opening in the slab floor exposing an installation area of the ground thereunder in close proximity to the desired installation location for the helical pile, said method using a rotary drive machine comprising: a vertical frame having an upper end and an open lower end for positioning over an installation section of ground in which it is desired to rotationally install at least one helical pile section; a rotary power means for the rotation and installation of a helical pile section through the open lower end of the frame; a vertical movement guide slidably engaging the rotary power means, to allow for retention and guidance of the rotary power means therealong; a vertical actuator operatively attached to the rotary power means, capable of powered movement of the rotary power means along the vertical movement guide as desired; and at least one slab anchor for engaging and retaining the vertical frame and the lower end thereof in relation to an installation opening in the slab exposing the installation section of ground, wherein the method comprises: manipulating the open bottom end of the frame and the position over top of the installation opening in the slab; anchoring the machine to the outer perimeter of the installation opening using the at least one slab anchor; positioning a helical pile section within the frame, engaging the point on the ground therebeneath at which it is desired to install the helical pile section; attaching an upper end of the helical pile section to the rotary power means; actuating the rotary power means to rotate the helical pile section and screw it into the ground; using the vertical actuator as required to drive the rotary power means and the helical pile section into the ground; and once the helical pile section is completely rotationally installed into the ground beneath the slab, detaching the rotary power means therefrom.

In an embodiment disclosed, the method further comprises cutting the installation opening in the slab floor in advance of the anchoring and position of the machine for installation of the helical pile.

In an embodiment disclosed, the method further comprises resetting the machine for the installation of a multi-section helical pile by: detaching the rotary power means from a first helical pile section having been driven into the ground close to the ground surface; retracting the rotary power means nearer the upper end of the frame using the vertical actuator; placing another helical pile section into the frame and attaching the bottom of said helical pile section to the top of the section exposed and already installed in the ground; attaching the rotary power means to the top of the supplemental helical pile section having been attached; and actuating the rotary power means and the vertical actuator to continue driving the supplemental helical pile section into the ground.

The overall nature of the rotary drive machine and the method of its use for the installation of single or multi-sectional helical piles will be understood based on this disclosure and all such modifications as would be obvious to those skilled in the art are intended to be encompassed herein.

BRIEF DESCRIPTION OF THE DRAWINGS

Embodiments of the present disclosure will now be described, by way of example only, with reference to the attached Figures.

DETAILED DESCRIPTION OF ILLUSTRATED EMBODIMENTS

As outlined herein, the present disclosure comprises a rotary drive machine for the installation of helical piles through a floor slab, including in locations in close proximity to the interior of a building foundation.

Figure 1:
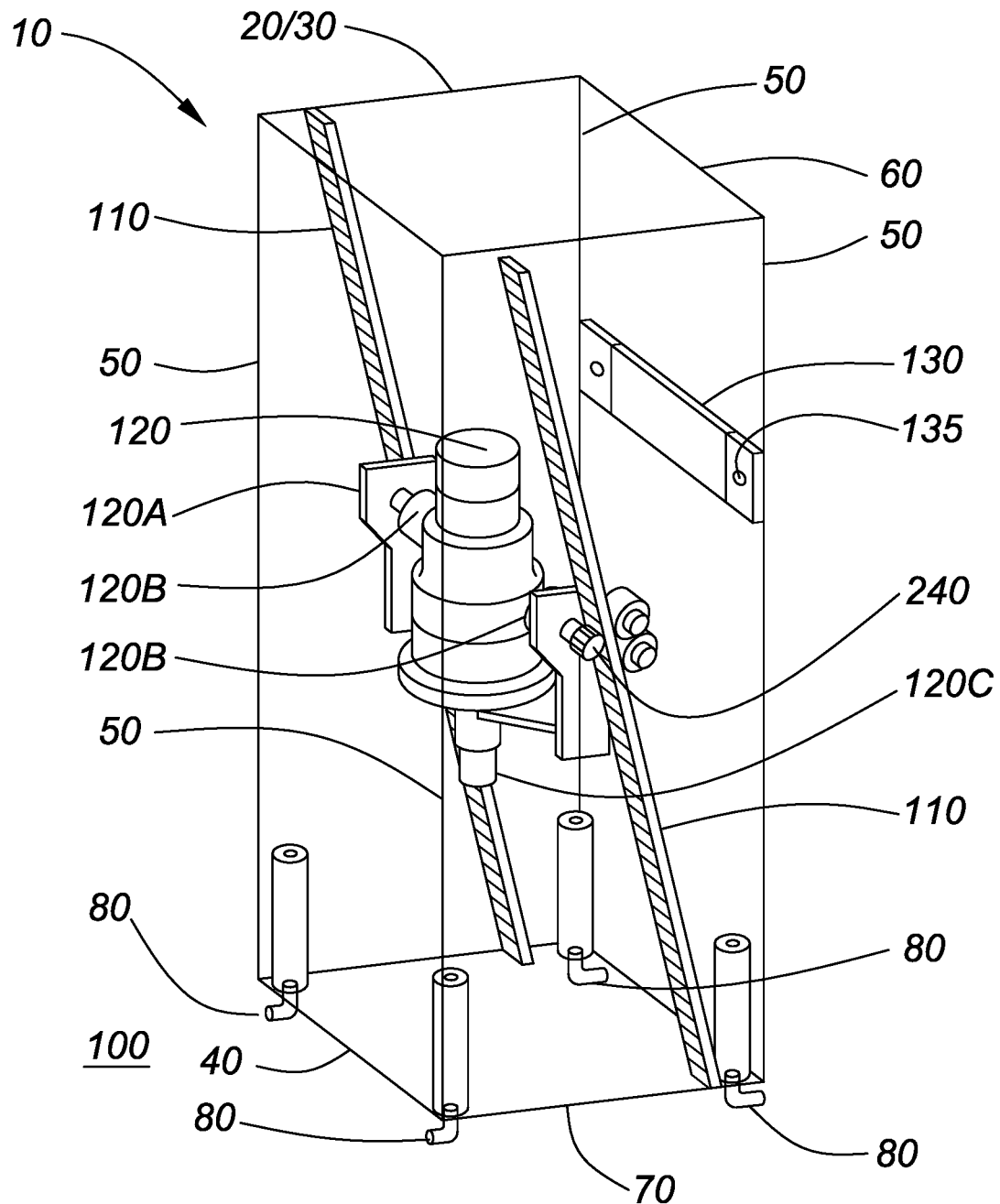
FIG. 1 is a perspective view of one embodiment of the machine in accordance with the present disclosure.

FIG. 1 is a first perspective view of one embodiment of a machine 10 in accordance with the present disclosure. Machine 10 includes a frame 20 having an upper end 30 and an open lower end 40. The frame 20 as shown consists of four vertical members 50 with perimeter defining end frames 60 and 70 defining the upper and lower ends 30, 40 of the frame 20. The end frame 70, at the open lower end 40, shows one open side, being the side through which angled positioning of helical pile sections can be achieved.

The shape of frame 20 shown is but one example. The cross-section may instead, for example, have a greater number of sides, may be triangular, may circular, or may be a combination. The shape of the frame 20 may be, for example, a pyramid or section of a pyramid or a cone or section of a cone.

Figure 7:
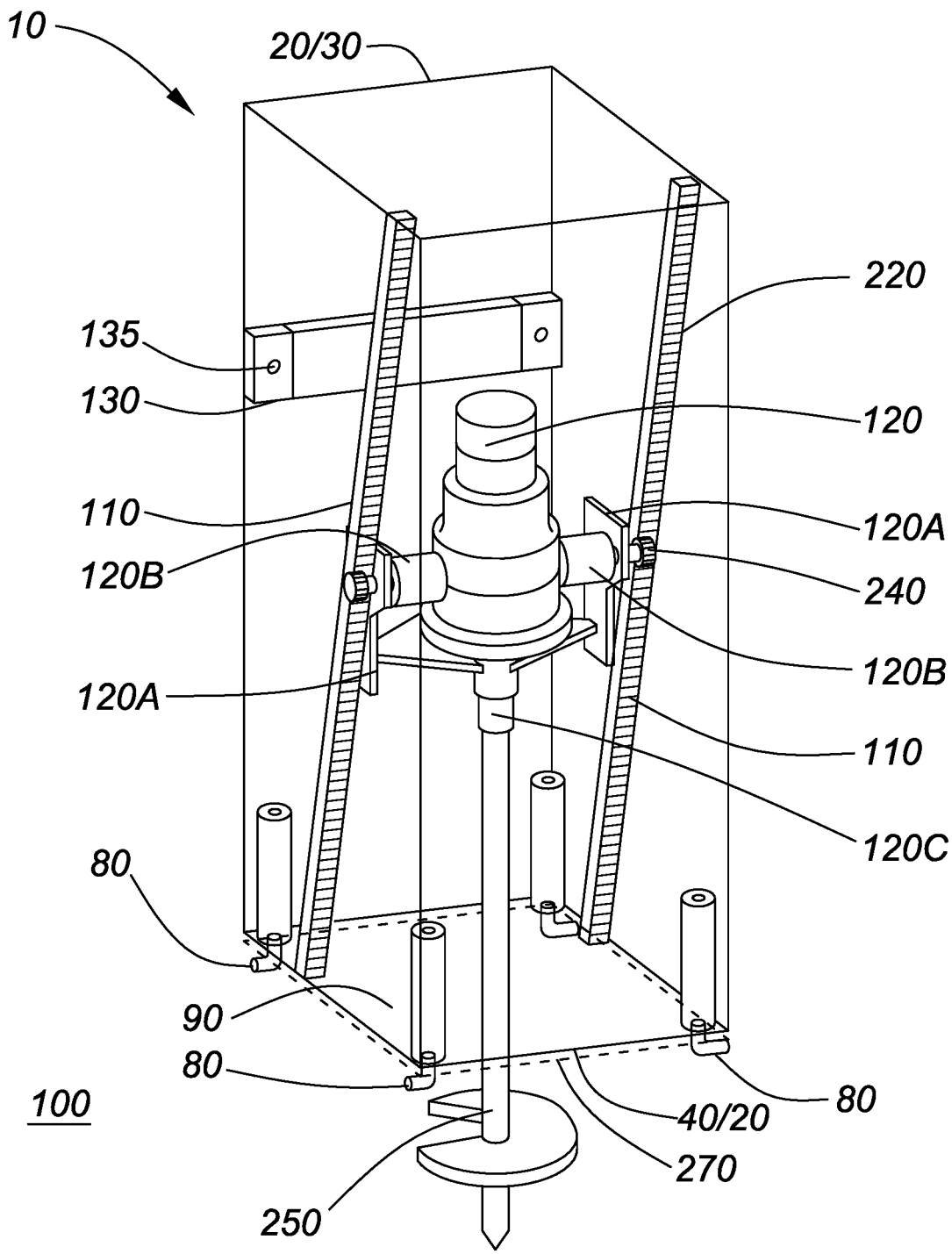
FIG. 7 shows the embodiment of FIG. 1 attached in position to a floor slab, and installing a helical pile section.

The machine 10 also shows a plurality of slab anchors, for example four slab anchors 80 for the purpose of mounting the machine 10 in relation to an installation opening 90 in a slab floor 100 (see FIG. 7).

Vertical movement guides 110 are shown, for the purpose of slidably retaining and guiding the rotary power means 120 attached to a helical pile section (see FIG. 7) along a defined path as the helical pile section is driven into the ground beneath the installation opening 90 in the slab floor 100. Vertical movement guides 110 are shown angled, such that rotary power means 120 moves toward a back side having foundation anchor 130. The back side, with foundation anchor 130 is preferably set relatively near the foundation, such as a basement wall, and the front side, opposite the back side is generally open in order to allow positioning of a helical pile 250 into the frame 20 for driving by rotary power means 120.

In an embodiment disclosed, the angle of the vertical movement guides 110 may be substantially vertical or may be adjustable between about 0 degrees (substantially vertical) and about +/−45 degrees, between about +/−5 degrees and about +/−22.5 degrees, or between about +/−10 degrees and +/−15 degrees. While shown substantially vertical, rotary power means 120 may be set at another angle/inclination, for example the rotary axis may be generally or substantially parallel with the guides 110 or even angled toward the guides 110.

The machine 10 could also include powered vertical actuation means. A vertical actuator such as a hydraulic cylinder or the like could be used to exert downward pressure on the helical pile section attached while rotated into position in the ground (see FIG. 13).

Referring to FIG. 1, the vertical movement guides 110 may be cog strips having teeth therealong, and corresponding drive gear assemblies to vertically position or drive the rotary power means 120 up and down along the cog strips 220. The drive gear assemblies are held in engagement with the cog strip, for example using a guide. In an embodiment disclosed, the guide may include one or more rollers on the opposite, non-cog, side of the cog strip.

The vertical actuator could also be a linear actuator using rotary to linear motion. For example, the vertical movement guide 110 may include a threaded rod and corresponding threaded collars (see FIG. 14) attached to the rotary power means 120, whereby the rotary power means 120 could be moved up and down from the top, e.g. upper end 30/end frame 60 to the lower end 40/end frame 70 of the frame 20 by rotating the threaded rod or rods resulting in the application of the lifting or lowering force on the rotary power means 120 and permitting effectively the movement of the rotary power means 120 along the entire length of the vertical movement guide 110 without needing to worry about hydraulic cylinders extending outside of the frame 20 of the machine 10. In the embodiment shown, the vertical movement guides 110 comprise threaded rods which are rotationally powered for the purpose of lifting or lowering the rotary power means 120. Alternatively, the threaded rods may be fixed and the threaded collars rotated to effect vertical movement—i.e. relative rotary motion between the threaded rods and threaded collars. Not shown in the Figures is a hydraulic pump for the purpose of powering the various hydraulic actuators of the machine 10.

Figure 2:
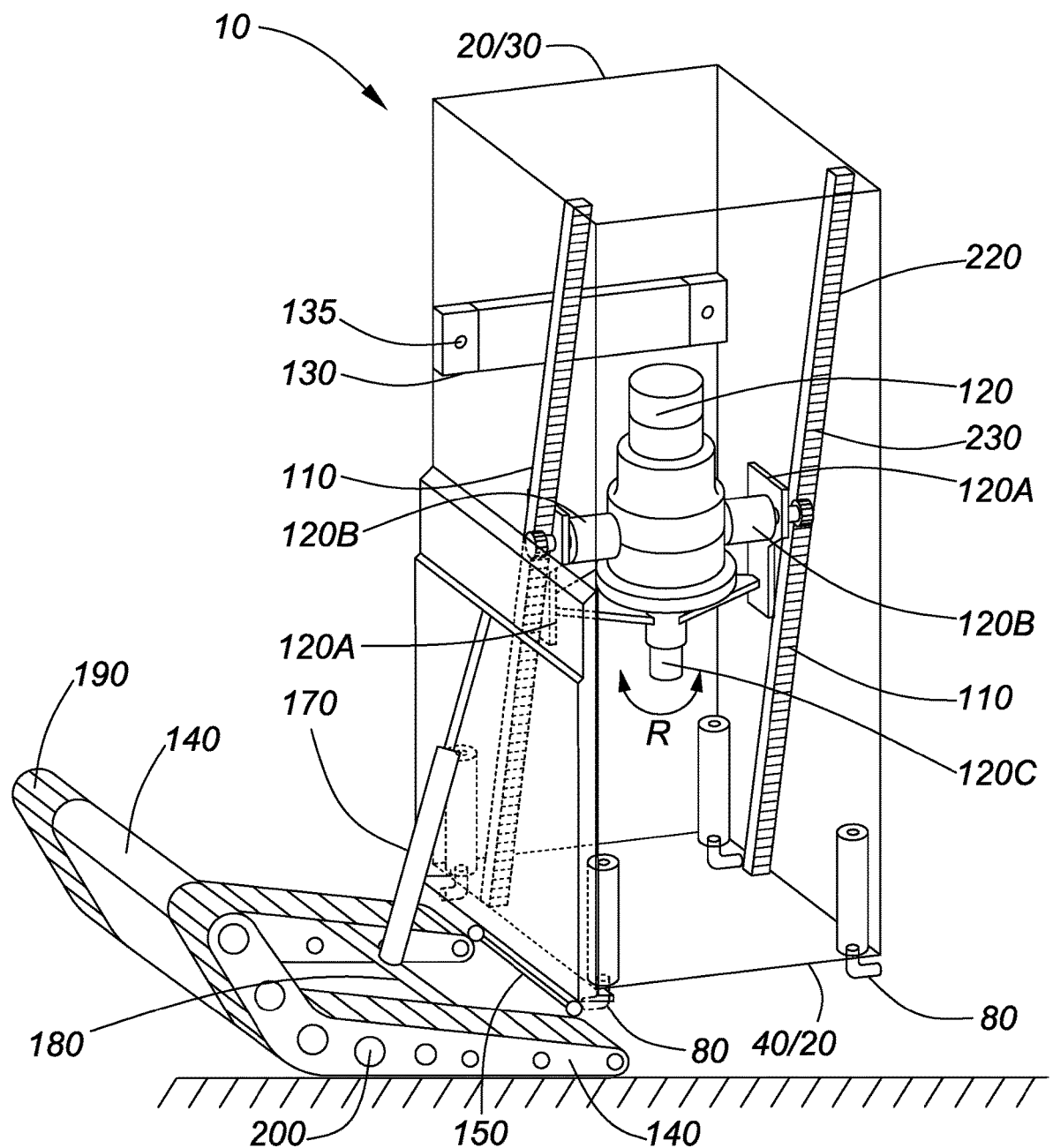
FIG. 2 is a perspective view of the embodiment of FIG. 1 further comprising the addition of a powered track assembly.

FIG. 2 illustrates an alternate embodiment of the machine 10 of the present disclosure. The machine 10 includes a pivotally attached powered track assembly 140, shown in a lowered position. The frame 20 and the powered track assembly 140 may be attached at pin connection 150. It will be understood to those skilled in the art of the use of hingedly attached powered track assemblies such as this that they can also be retracted vertically in relation to the remainder of the device. The powered track assembly 140 as shown could be used in maneuvering the machine 10 on the slab floor 100, or to help to climb the machine 10 up and down stairs 160 (see FIG. 6) or other inclined surfaces (see FIG. 4). Many different types of powered track assemblies or means of attachment thereto are contemplated within the scope of the present disclosure. Actuator 170 may be used to manipulate the relative position of the frame 20 and powered track assembly 140. The actuator 170 may be a linear actuator. The powered track assembly 140 and actuator 170 may be hydraulically powered, or may be for example, powered by electricity or by battery power. In an embodiment disclosed, the powered track assembly 140 includes a chassis 180 and powered continuous tracks 190 extending around a plurality of sprockets 200, with one or more sprockets 200 driven by a drive within the chassis 180. The powered track assembly 140 and/or the actuator 170 may be operated by a control station. The control station may be on or proximate the chassis 180.

The powered track assembly 140 may include a carrier 175 adapted to engage and operatively attach the frame 20 and the powered track assembly 140. In this case, actuator 170 would extend between the chassis 180 and the carrier 175. The powered track assembly 140 may be powered for example, by hydraulic, electric motors and/or cylinders and combinations thereof. The powered track assembly 140 may include an on-board battery to provide power to drive the powered continuous tracks or the actuator 70 or both in a cordless manner.

In the case of the embodiment of FIG. 2 the primary change in this embodiment in addition to the illustration of the power track assembly 140 is the configuration of the vertical movement guides 110 and their cooperative engagement with the rotary power means 120 and rotary power assembly 120A. In the embodiment of FIG. 2, the vertical movement guides 110 are vertically oriented cog strips 220 having teeth 230 therealong. The rotary power means 120 is shown in conjunction with a rotary power assembly 120A which engages the cog strips 220 and includes hydraulic motors 120B with corresponding gear assemblies 240 (see also FIG. 7) which can effectively drive the rotary power means 120 and the rotary power assembly 120A up and down along the cog strips 220. While cog strips 220 (and corresponding gear assemblies 240) are illustrated as having helical teeth, they may of course be straight teeth. The cog strip 220 and corresponding gear assembly 240 may equally be described as a rack and pinion.

The different vertical movement guides 110 shown in FIG. 2 and the corresponding changes to the remainder of the related rotary power means 120 and assembly 120A are intended to show that there are many different means of assisted vertical movement and guidance for the rotary power means 120 and all are contemplated within the scope of the present disclosure.

The embodiment of FIG. 2 also shows all four sides of the frame end 70 at the open lower end 40 being closed.

It is again specifically contemplated that the machine 10 would also include hydraulic power means, capable of not only driving the rotary power means for rotation of the helical pile section into the ground but also for providing hydraulic power to the hydraulic motors 120B which will drive the rotary power assembly 120A up and down along the vertical movement guides 110. A hydraulic power means such as a hydraulic pump could also power the powered track assembly 140 which is shown. In an embodiment disclosed, the hydraulic power means is located remote from the machine 10, for example if the machine 10 is located inside the foundation perimeter, for example in the basement of a residential home or upon the slab floor of a commercial or retail building, the hydraulic power means may be located outside the foundation perimeter, with the necessary number of hydraulic hoses extending between the machine and the hydraulic power means.

However, in another embodiment disclosed, the hydraulic power means may be provided proximate the machine 10, for example also inside the foundation perimeter.

The controls for the machine 10 for use in operation would include controls for actuation of the rotary power means 120, as well as control for the hydraulic motors 120B which move the rotary power assembly 120A up and down along the cog strips 220 to provide downward pressure on the helical pile section while it is driven into the ground. A control block, providing control levers to selectively actuate the hydraulic actuator(s) and/or hydraulic motor(s) is provided between the hydraulic power means and the machine 10. The control block may be, for example, provided on or near the machine 10.

Where the embodiment of FIG. 1 shows angled vertical movement guides 110 for the purpose of installation of a helical pile at an angle, and that the angle of vertical movement guides 110 may be adjustable relative to frame 20, it will also be understood that the rotary power assembly 120A and the connection of the rotary power means 120 thereto which is used to drive the helical pile section into the ground could be movably attached so that they could permit angling of the helical pile without needing to alter the positioning of the vertical movement guides 110 off of a complete vertical. Both such approaches are contemplated within the scope of the present disclosure.

Figure 3:
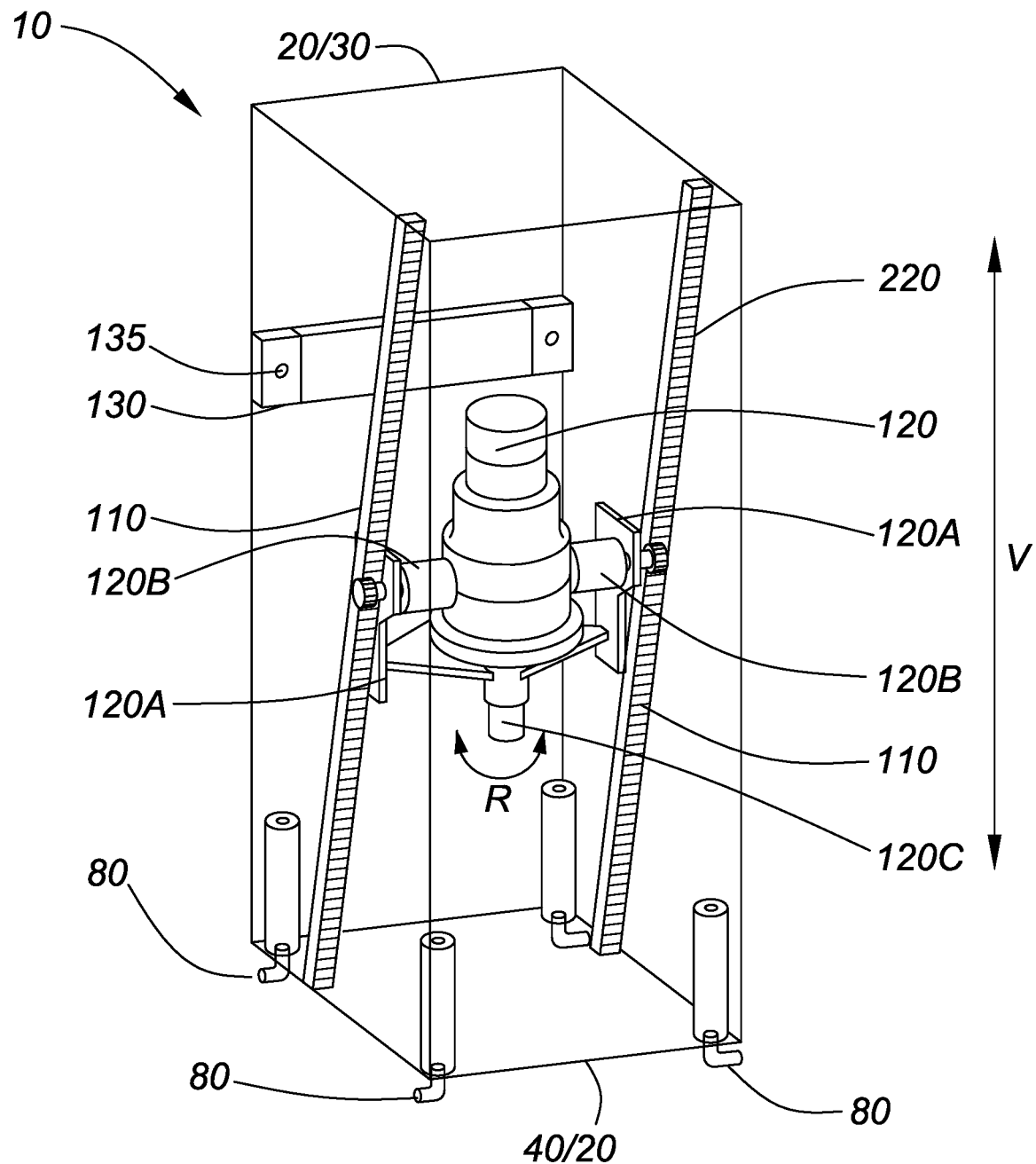
FIG. 3 illustrates a front perspective view of the embodiment of FIG. 2.

FIG. 3 is a front view of the embodiment of FIG. 2. The machine 10 is shown, again along with the frame 20 having an upper end 30 and an open lower end 40. The frame as shown consists of four vertical members 50 with perimeter defining end frames 60 and 70 defining the upper and lower ends 30, 40 of the frame 20.

The vertical movement guides 110, namely the cog strips 220 which are vertically mounted and along which the rotary power assembly 120A can travel are shown. The assembly 120A includes the rotary power means 120 which is a hydraulic motor for the purpose of rotating a helical pile section attached thereto. The rotary power assembly 120A is mounted to travel along the vertical movement guides 110 when the hydraulic motors 120B are actuated. The vertical movement guides 110 will retain the rotary power assembly 120A and the rotary power means 120 in its spatial position in relation to the remainder of the machine as it operates. FIG. 3 also shows a pile connector, for example socket 120C, which will engage a helical pile 250. The rotary motion R of the rotary power means 120 is shown, along with the upwards and downwards travel of the rotary power assembly 120A along the vertical movement guides 110. Again in this FIG. 3 for the sake of simplicity, hydraulic lines and controls are not shown but the use of a hydraulic pump would occasion the presence of various hydraulic lines and control connections which will be understood to those skilled in the art.

Figure 4:
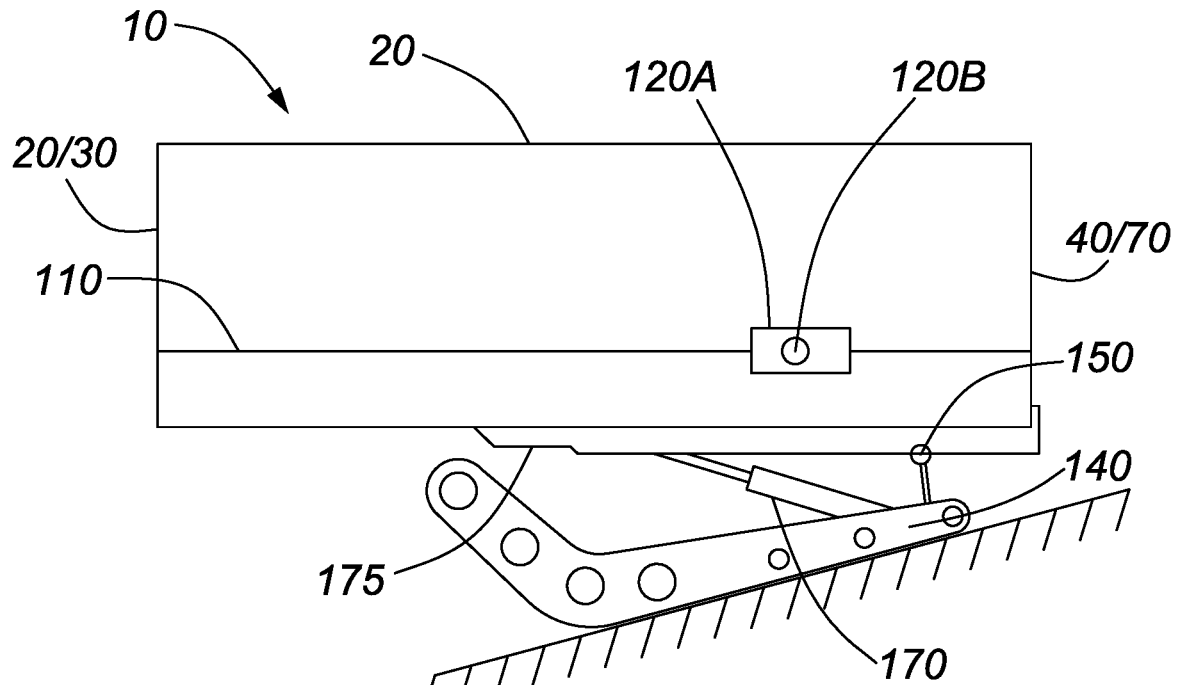
FIG. 4 illustrates a side view of the embodiment of FIG. 2 in a horizontal movement position, folded onto the powered track assembly.

Referring next to FIG. 4, the embodiment of FIG. 2 is shown in a horizontal transport position with frame 20 laid down on top of the powered track assembly 140.

Figure 5:
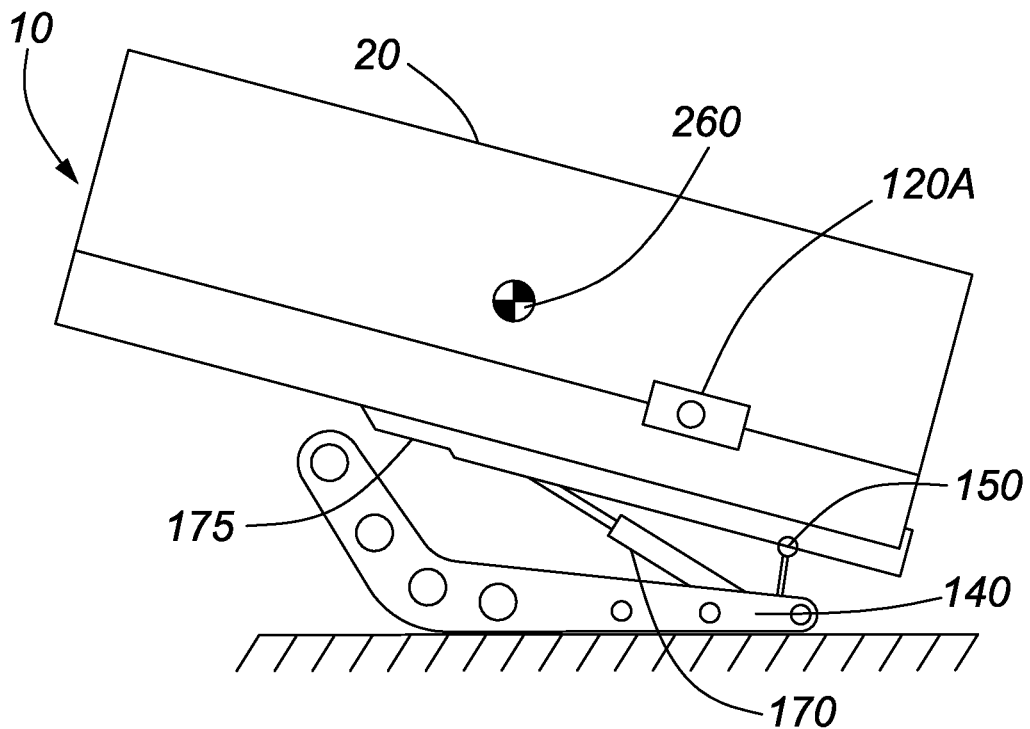
FIG. 5 illustrates a side view of the embodiment of FIG. 2, in one of many possible positions between the horizontal movement position of FIG. 4 and the operating position of FIG. 2.

FIG. 5 illustrates frame 20 in-between the horizontal transport position of FIG. 4 and the operating position of FIG. 2, for example for movement on an sloped surface such on an earthen slope or a ramp. The actuator 170 may be used to adjust the angle between the frame 20 and the powered track assembly 140.

Figure 6:
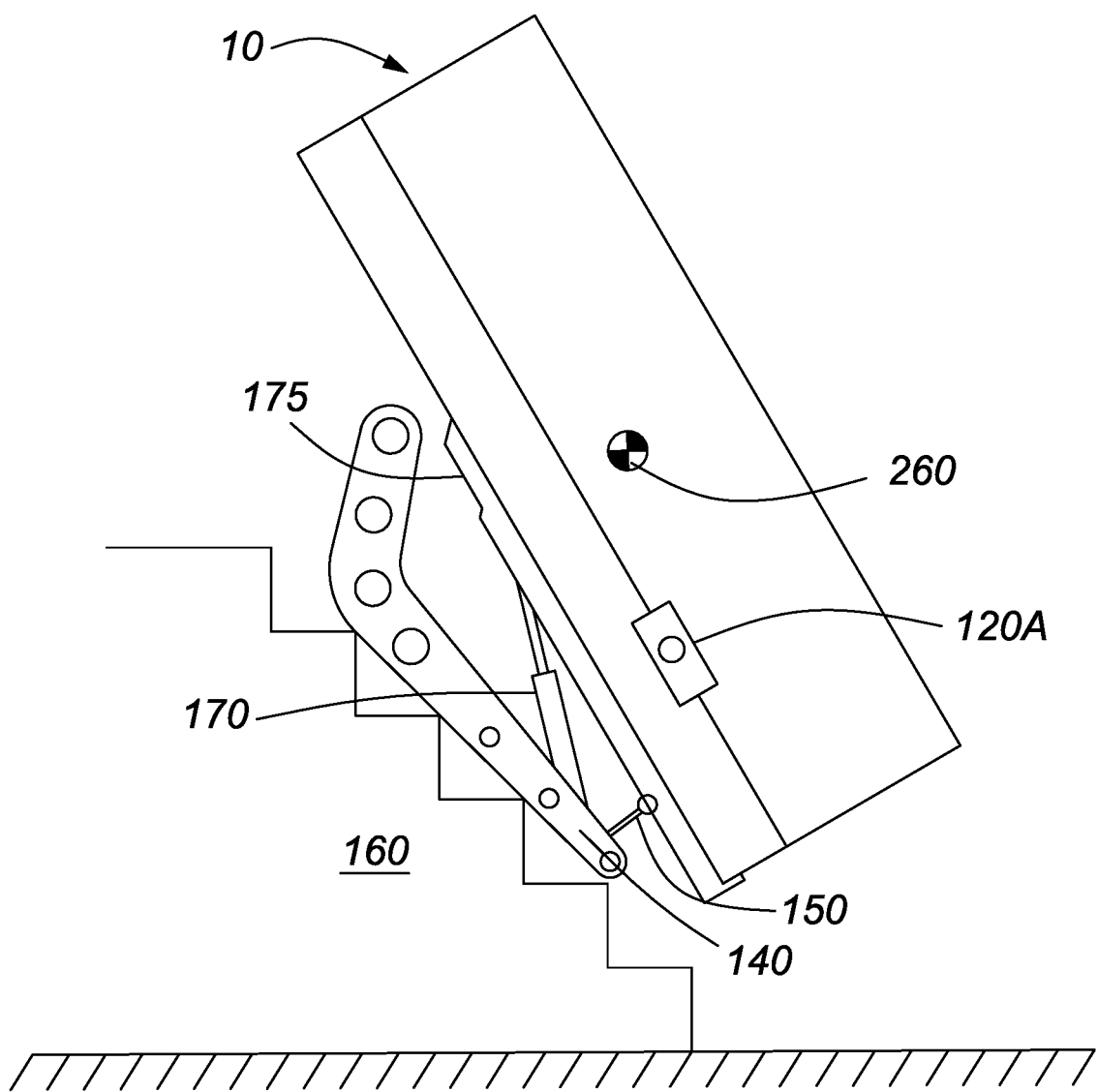
FIG. 6 illustrates a side view of the embodiment of FIG. 2, moving the machine up or down stairs.

FIG. 6 illustrates frame 2 in-between the horizontal transport position of FIG. 4 and the operating position of FIG. 2, for example for movement on an incline such as on/over one or more step, e.g. stairs 160. The actuator 170 may be used to adjust the angle between the frame 20 and the powered track assembly 140. In doing so, the center of gravity 260 of the machine 10 may be adjusted to improve stability.

FIG. 7 shows another view of the embodiment of FIG. 3, including illustrating the attachment of the machine 10 to the slab floor 100, and also showing the helical pile section 250. The outer perimeter 270 of the installation opening 90 is shown in dotted relief, and also shown in dotted lines is the extension of the slab anchors 80 underneath the slab floor 100. As outlined above, there are many different types of slab anchors 80 which could be contemplated but one approach is the mounting of a threaded rod 280 to an anchoring tab 290 which can be rotatably positioned underneath the slab 100 around the outer perimeter 270 of the installation opening 90 when extended a sufficient distance through a threaded collar 300 from the bottom of the frame 20. In an embodiment disclosed, anchoring tab 290 may be pivotally attached to a lower end of a bolt or threaded rod, with corresponding nut or collar 300 connected to the lower end 70 of the frame 20, and the bolt or threaded rod rotatable, for example by its head or a nut attached to the threaded rod at an end opposite the anchoring tab 290, in order to move the anchoring tab 290 up or down by rotating the bolt or threaded rod. By then rotating or pulling up the threaded rod 280, the anchoring tab 290 on the bottom of the slab anchors 80 can be caused to engage the bottom of the slab floor 20 and hold the machine 10 in position.

Optionally, one or more foundation anchor 130 may be provided on the side of the frame 20 that faces the foundation when the machine is positioned proximate the foundation when in use. The foundation anchor 130 may include a member extending between vertical members 50, 50 and having one or more holes 135 through which a fastener, such as a bolt or screw can be installed to provide additional anchoring, for example to a cement wall of a foundation.

In an embodiment disclosed, a torque monitoring system is provided. The torque monitoring system may measure and/or indicate and/or record/log one or more factor related to the rotary pile installation. In an embodiment disclosed, the one or more factor includes the torque applied to the rotary pile. In an embodiment disclosed, the torque monitoring system may include a pressure gauge or gauges to measure hydraulic pressure differential across the rotary power means 120 and/or an electronic torque transducer placed in-line with rotary power means 120/helical pile section 250, for example between socket 120C and the helical pile section 250. In an embodiment disclosed, the one or more factor may include, for example, one or more of torque applied, depth, angle/inclination, turns, date and/or time, and location. In an embodiment disclosed, the one or more factor may be final, as-installed, or may also include data collected at one or more points through the installation, for example at selected intervals, points, or depths, or in a substantially continuous manner.

Again FIG. 7 shows the key components to illustrate the operation of the apparatus but does not include the hydraulic lines control lines etc., for the purpose of maintaining some simplicity in the drawing. Presence of a hydraulic pump and/or hydraulic lines and control lines etc. will all be understood to those skilled in the art and are all contemplated within the scope of the present disclosure.

Figure 8:
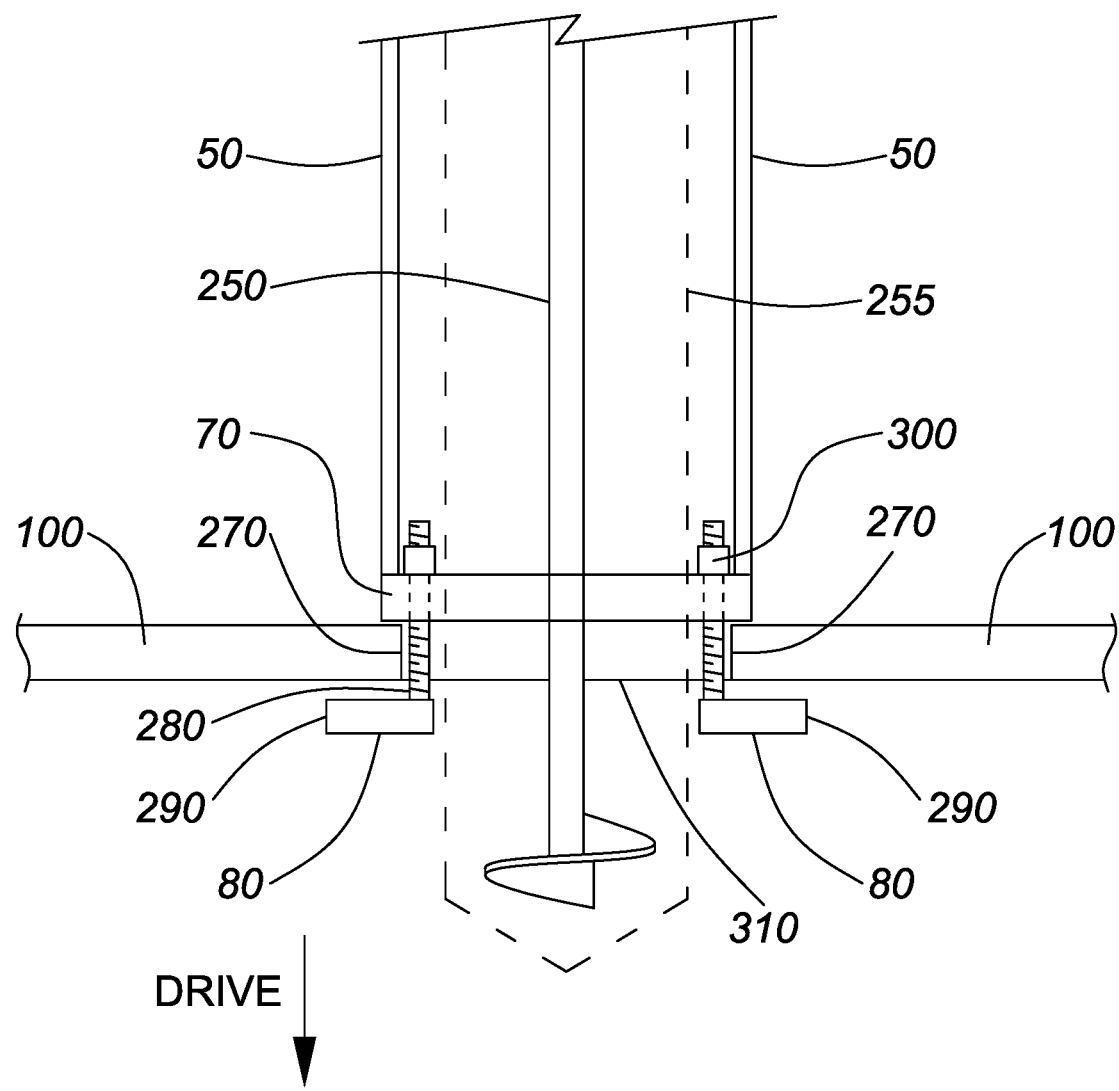
FIG. 8 is a detail view illustrating one example of slab anchors.

FIG. 8 is a close up view of the open lower end of the machine 10, showing the driving of a helical pile section 250 into the ground. FIG. 8 is intended to show in more detail the use of the slab anchors 80 to attach the machine 10 in relation to the outer perimeter 270 of the installation opening 90 in the slab floor 20. Ground surface 310 is also shown, and while illustrated as generally aligned with the bottom of the slab floor 20, the ground surface 310 need not align with the bottom of the slab floor 20, and the disclosed machine may be used regardless of where one finds the ground surface 310 upon creating the installation opening 90. As the helical pile section 250 is rotated, it will be driven down into the ground as shown. When the installation of the pile 250 is complete, the pile 250 is released from the rotary power means 120, the slab anchors 80 can be released and the machine moved away. The pile 250 may then be used as intended, e.g. the foundation can then be jacked and/or supported by the pile 250. Then there is only the installation opening 90 in the slab floor 100, defined at its outer perimeter 270, requiring slab repair and there is no significant disturbance around the foundation (i.e. in contrast to prior art techniques described previously, entailing externally accessing the foundation of the building by digging a substantial trench around the outside of the building foundation, and underneath of the building foundation in order to enable access for the installation of heavy mechanical lifting equipment such as, for example, screw jacks and helical piles.

Figure 9:
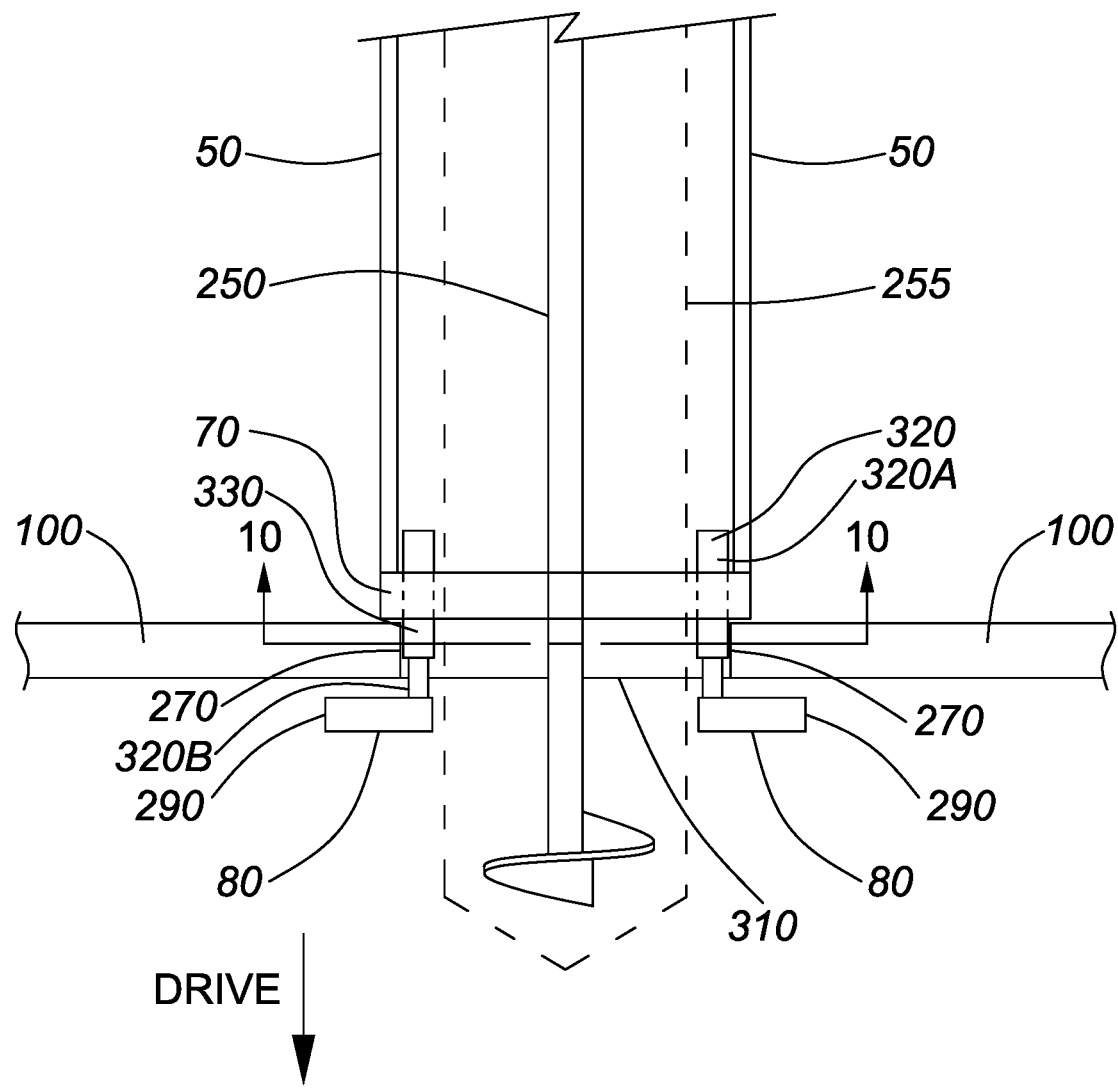
FIG. 9 is a detail view illustrating one example of slab anchors.

FIG. 9 illustrates a further example of a slab anchor 80 contemplated within the scope of the present disclosure. The slab anchor 80 uses an anchoring tab 290 on or operatively connected with a hydraulic actuator 320. A hydraulic actuator 320, known to a person skilled in the art, includes a hydraulic cylinder 320A and a rod 320B. The hydraulic cylinder 320A is operatively connected with frame 20 and is used to lower and raise the anchoring tab 290 on rod 320B. Anchoring tab 290 swings at least about 90 degrees, such as 360 degrees or more about rod 320B, in order to allow the anchoring tab 290 to be inserted into the installation opening 90 within outer perimeter 270, and then be pivoted such that at least a portion of the anchoring tab 290 is under the slab floor 100 in order to engage the slab floor 100. The hydraulic actuator 320 can apply a force ranging from substantially zero pounds up to several thousand pounds of force in order to clamp the machine 10 securely to the slab floor 100, providing stability when the machine 10 is in operation. Also shown in FIG. 9 is anchor bearing 330, described below.

Figure 10:
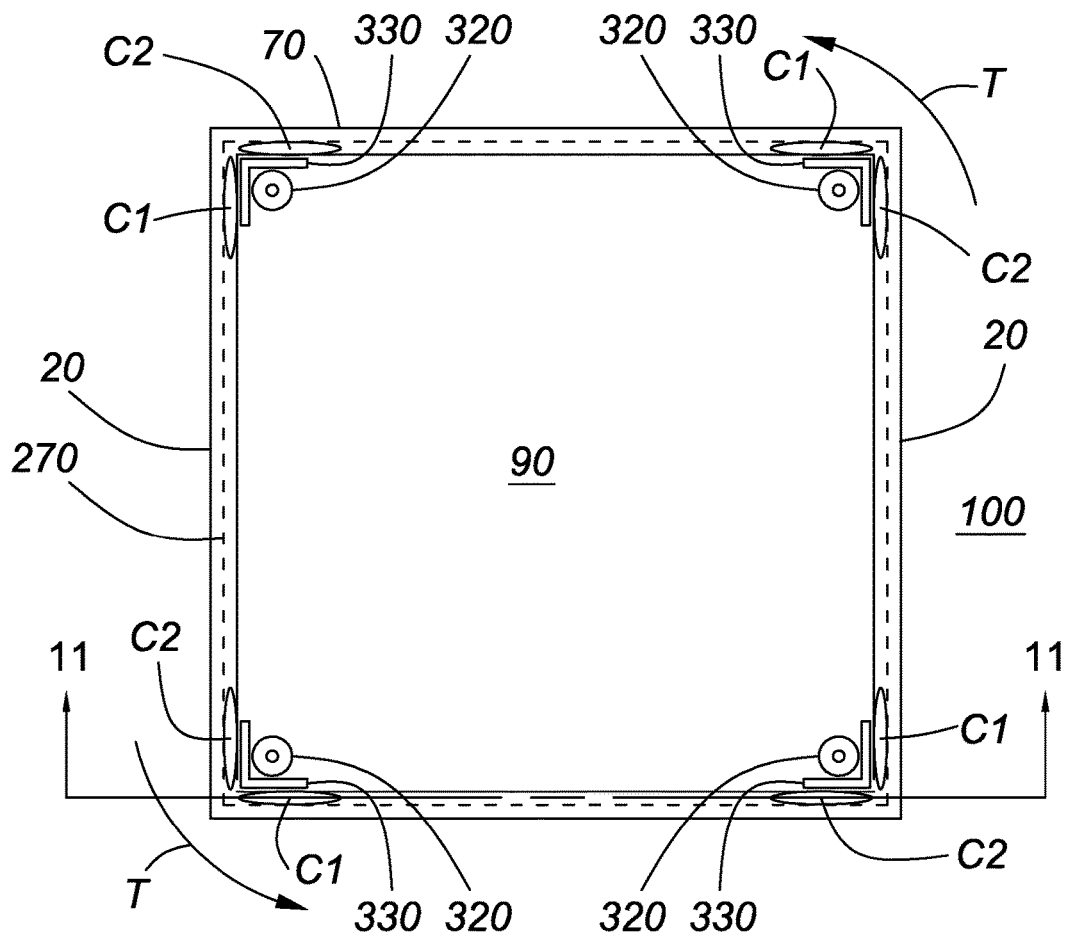
FIG. 10 is a detail view illustrating one example of slab anchors along 10-10 of FIG. 9.
Figure 11:
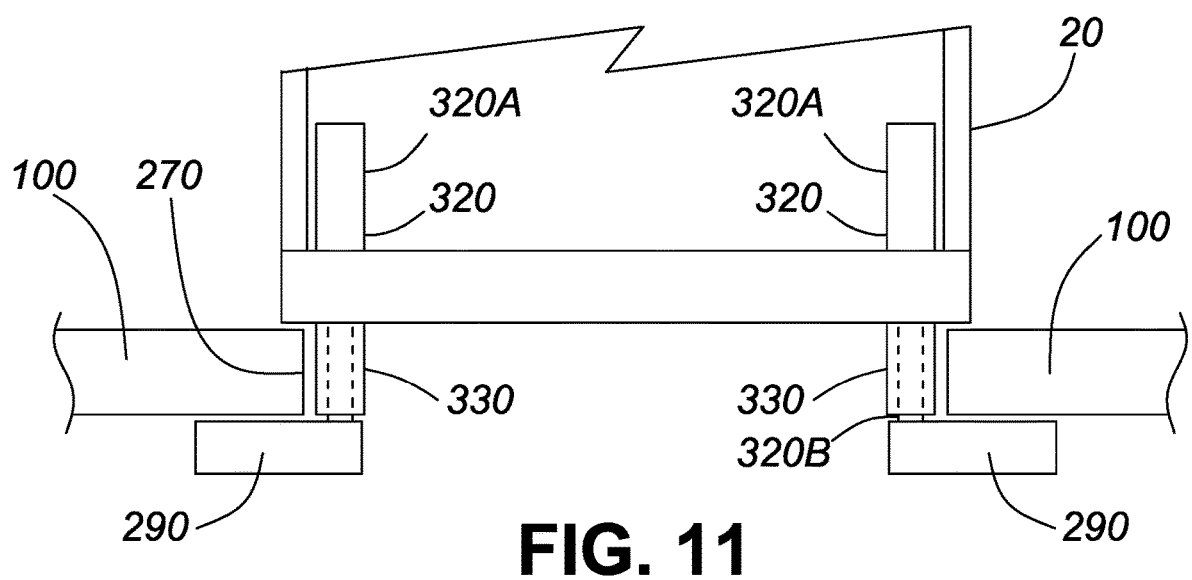
FIG. 11 is a side view of FIG. 10 along 11-11 of FIG. 10.

FIGS. 10, 11 illustrate a further example of a slab anchor 80 contemplated within the scope of the present disclosure. As illustrated in, for example, FIGS. 7, 8, 9, slab anchor 80 extends through the perimeter 270 of the slab floor 20 substantially proximate to the perimeter 270 of the slab floor 100. In an embodiment disclosed, the slab anchor 80 may, at least in part, engage the perimeter 270 of the slab floor 100 laterally if the machine 10 rotates relative to the slab floor 100, so that rotational forces imparted on the frame 20 by the rotary means 120 driving the pile section 250 are restrained. For example, referring to FIG. 7, even if slab anchors 80 do not tightly clamp the slab floor 100, frame 20 cannot rotate significantly relative to the perimeter 270 of the installation opening 90, because the slab anchors 80 would engage the slab floor 100 at the outer perimeter 270. As one may not want to impart significant lateral forces directly on the threaded rod 280 (FIG. 8) or the hydraulic actuator 320 (FIG. 9), two or more anchor bearings 330 may extend from the bottom of the machine 10, e.g. extending from lower end 40 or end frame 70 of frame 20, to enter the installation opening 90 and engage the perimeter 270 in the event the machine 10 is rotated and anchor the machine 10 from further rotation.

Referring to FIGS. 10, 11, in an embodiment where rotary drive 120 turns right (i.e. clockwise when viewed from above), if for whatever reason frame 20, e.g. end frame 70 of the machine 10 rotates anticlockwise relative to the installation opening 90 in reaction to torque T applied to frame 20, it can only do so a relatively minor amount, as anchor bearings 330 then engage the slab floor 100 at the outer perimeter 270 of the installation opening 90, e.g. one or more of contact C1. This works similarly (but in the other direction) when the rotary power means 120 turns anticlockwise, urging the frame 20, e.g. end frame 70 of the machine 10 in the other direction, where anchor bearings 330 would engage the slab floor 100 at the outer perimeter 270 of the installation opening 90, e.g. one or more of contacts C2.

The anchor bearings 330 must not interfere with other aspects of the slab anchors 80, for example the anchoring tab 290 whether it is mounted, for example on a threaded rod 280 (FIG. 6), a hydraulic actuator 320 (FIG. 7) or otherwise. In an embodiment disclosed, the anchor bearings 330 extend below the machine 10 by an amount about the same or a little less than the thickness of the slab floor 100. In an embodiment disclosed, the anchor bearings 330 extend below the machine 10 by about 2 inches to about 3 inches. In an embodiment disclosed, the installation opening 90 is created, e.g. cut, or adapted to a size to substantially or generally engage the anchor bearings 330 with a nominal gap therebetween. In an embodiment disclosed, the gap between the anchor bearings 330 and the installation opening 90 is between about 0.5 inches and about 2.5 inches, preferably about 1 inch.

In an embodiment disclosed, two or more types of slab anchor 80 may be used in combination, for example, by the hydraulic actuator 320 of FIG. 9 with the anchor bearings 330 of FIGS. 9, 10, 11.

Figure 12:
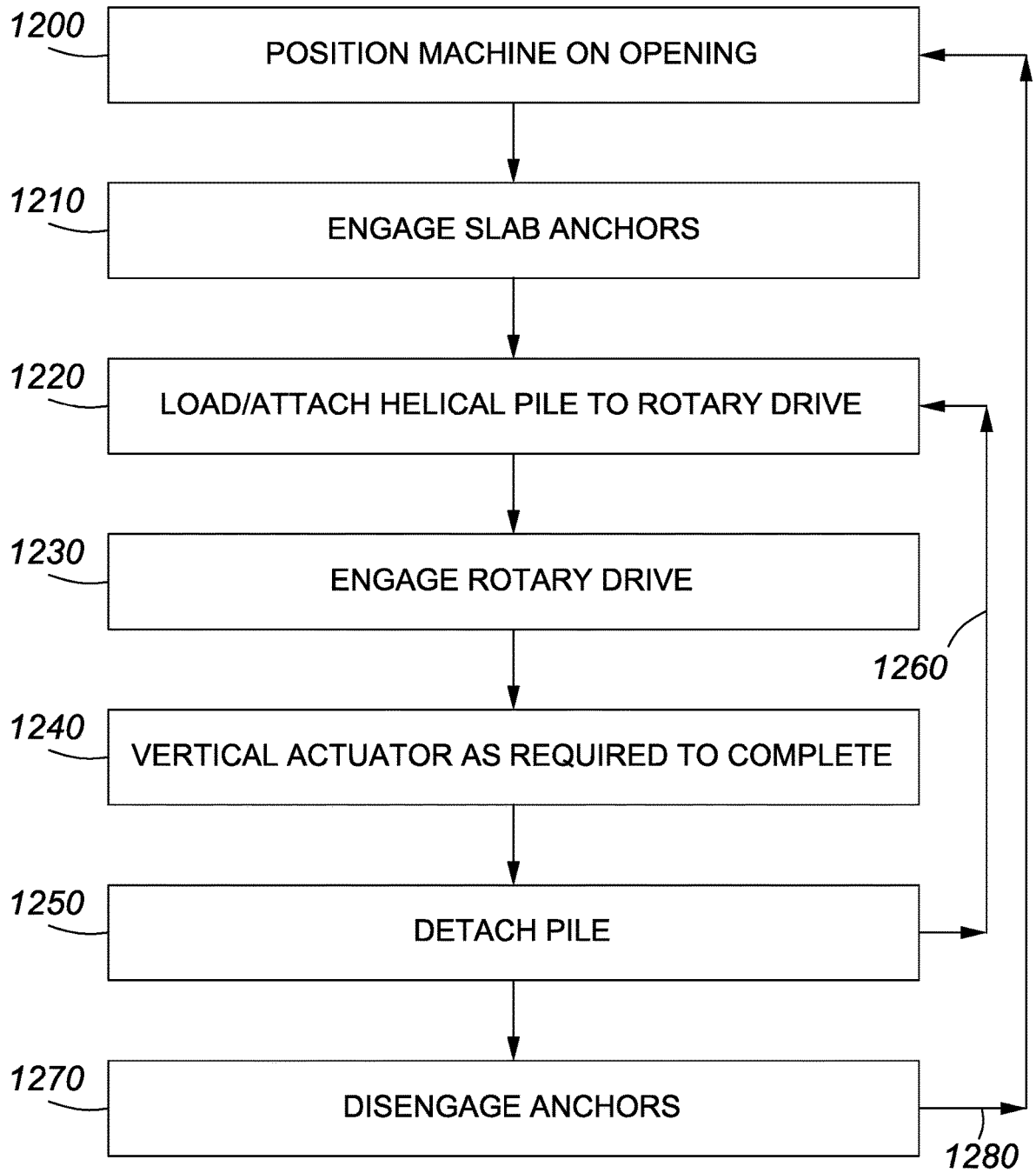
FIG. 12 is a flowchart illustrating the steps of one embodiment of the method of the present disclosure.

FIG. 12 is a flowchart illustrating the steps in one embodiment of the method of the present disclosure, namely the steps involved in using the rotary drive machine 10 of the present disclosure to install a helical pile section into the ground beneath the floor slab through an installation opening cut therein. In general, once an installation opening is provided in a slab, the major steps include 1200 position the machine 1 on the slab opening, 1210 engage one or more slab anchors, 1220 load/attach helical pile to the rotary drive, 1230 engage rotary drive and/or 1240 engage vertical actuator to install the helical pile section, 1250 detach the helical pile section, 1260 reset and repeat if necessary to install additional helical pile section(s), and once the helical pile for the installation opening is complete, 1270 disengage slab anchors, and then 1280 repeat for additional installation opening(s).

Figure 13:
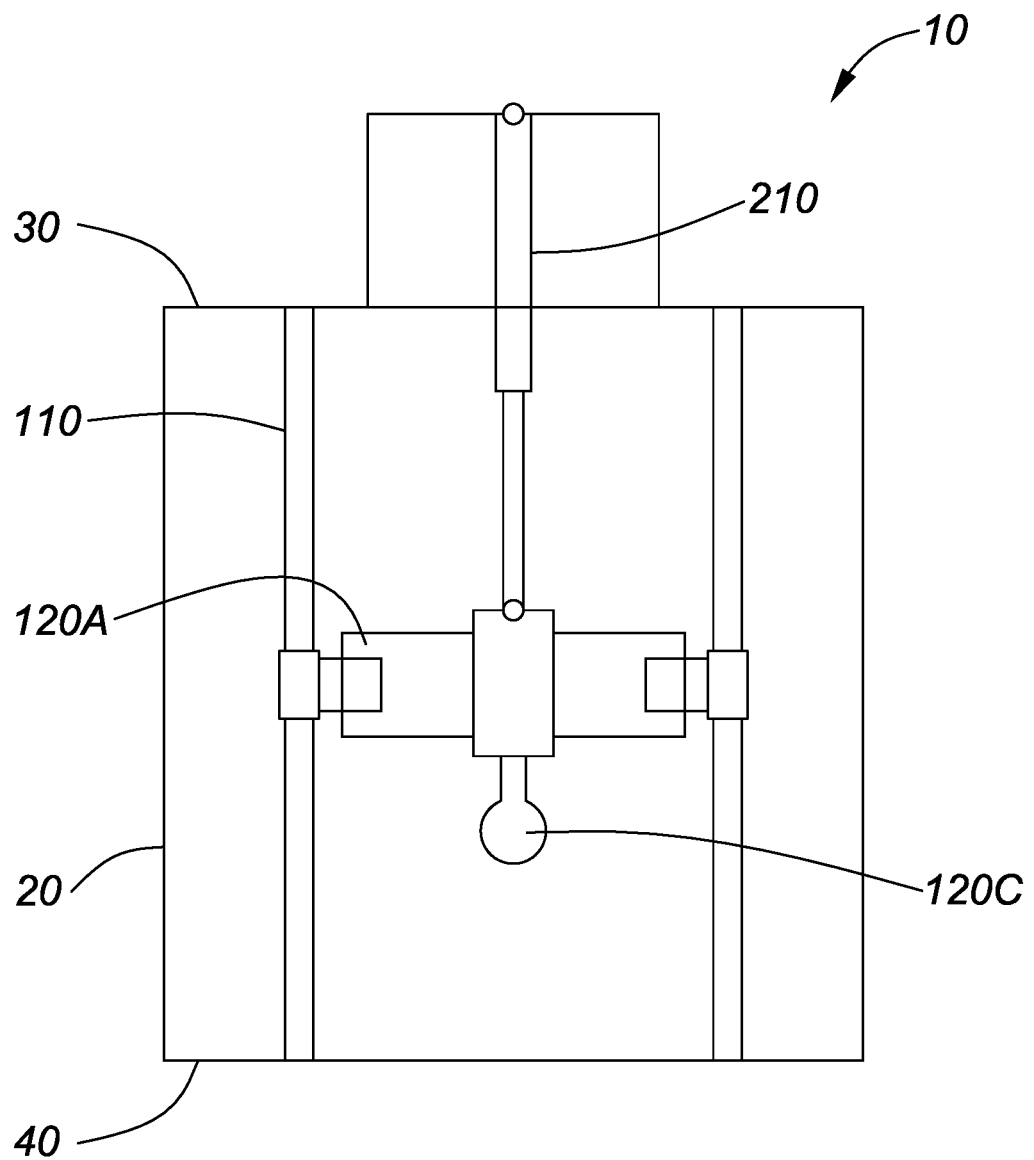
FIG. 13 is a simplified schematic of a machine of the present disclosure with a vertical actuator.

Referring to FIG. 13, the vertical actuator may include a hydraulic ram 210, with one end operatively connected with the frame 20 and the other end operatively connected with the rotary power assembly 120A in order to move the rotary power means 120 up or down, e.g. along vertical movement guides 110.

Figure 14:
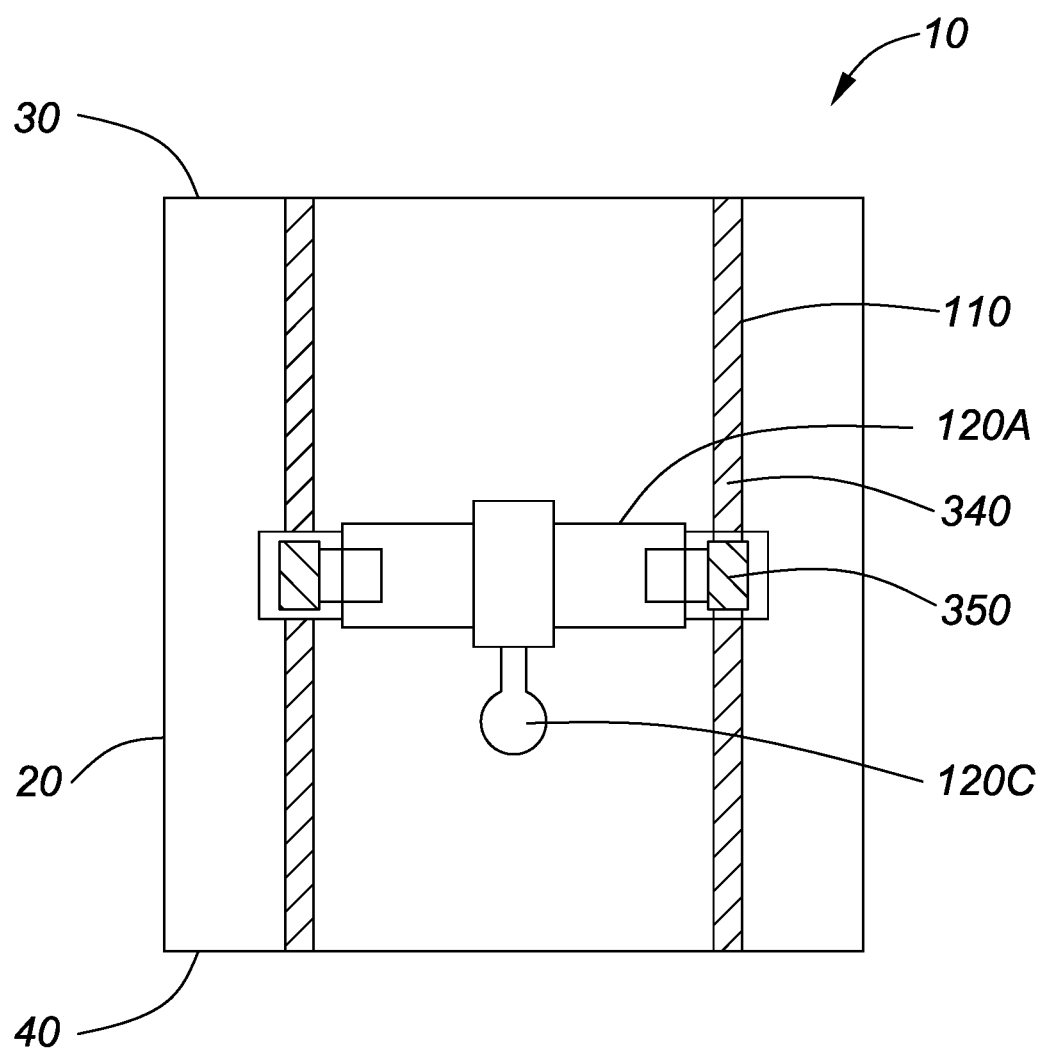
FIG. 14 is a simplified schematic of a machine of the present disclosure with a vertical actuator.

Referring to FIG. 14, the vertical actuator may include one or more linear actuator using rotary to linear motion. The vertical actuator may include one or more threaded rod 340 and corresponding threaded collar(s) 350, with the threaded rod and/or the threaded collars rotated in order to provide relative vertical movement. As shown, the threaded rod 340 may be connected with the frame 20 and the threaded collars 350 connected with the rotary power assembly 120 in order to move the rotary power means up or down.

In an embodiment disclosed, machine 10 may be of modular construction, consisting of a number of portions, for example limited in size and/or weight to a selected limit, that may readily be disassembled/assembled in order to facilitate transportation and/or installation of the machine 10. This may be useful for ingress/egress to an interior location of the foundation perimeter for example a residential basement or the like. For example with reference to FIG. 1, in an embodiment disclosed, such break down may include, as separate portions, one or more of the vertical movement guides 110, rotary power means 120, rotary power assembly 120A, and frame 20. In an embodiment disclosed, frame 20 may be broken down into two or more portions, such as end frame 60, vertical member 50 (x4) and end frame 70. In an embodiment disclosed, the modular portions are each less than about 200 lb.

Reference herein to "helical pile" and "helical pile section" should be treated as equivalent and reference to one includes reference to the other. Some helical piles are one-piece while other helical piles may consist of several sections, and both are contemplated as part of the present disclosure.

EMBODIMENTS

Embodiments of the disclosure may include any combination or subcombination of the apparatus and methods described herein and/or as shown in the following paragraphs. This is not to be considered a complete listing of all possible arrangements, as any number of variations are envisioned by the description herein.

Item 1. A rotary drive machine for the installation of helical piles from inside a perimeter of a building foundation having a slab floor therein, said machine comprising:
  a. a vertical frame having an upper end and an open lower end for positioning over an installation opening in the slab floor through which an installation section of ground in which it is desired to rotationally install at least one helical pile section is exposed;
  b. a rotary power means for the rotation and installation of the at least one helical pile section through the open lower end of the frame;
  c. a vertical movement guide slidably engaging the rotary power means, to allow for retention and guidance of the rotary power means therealong;
  d. a vertical actuator operatively attached to the rotary power means, capable of powered movement of the rotary power means along the vertical movement guide as desired; and
  e. at least one slab anchor for engaging and retaining the vertical frame and the lower end thereof in relation to the installation opening in the slab flow exposing the installation section of ground thereunder, at a desired operating position for the machine;
  wherein the at least one helical pile section can be installed with the machine by:
    i. positioning the machine over the installation opening in the slab floor;
    ii. anchoring the open lower end of the machine to the slab floor over the installation opening using the at least one slab anchor;
    iii. inserting the at least one helical pile section to be rotationally installed inside of the frame and attaching an upper end of the at least one helical pile section to the rotary power means;
- iv. actuating the rotary power means to apply a rotary motion to the at least one helical pile section for driving into the ground beneath the slab floor at the installation opening; and
- v. actuating the vertical actuator to push the rotary power means along the vertical movement guide and to drive the at least one helical pile section with a downward pressure motion as it is rotated by the rotary power means.

Item 2. The rotary drive machine of Item 1, wherein the rotary power means and/or the vertical actuator are hydraulic.

Item 3. The rotary drive machine of Item 1 or 2, wherein the rotary power means and/or the vertical actuator comprise a hydraulic motor.

Item 4. The rotary drive machine of any one of Items 1-3, wherein the vertical actuator comprises a rack and pinion, wherein the rack is operatively connected with the frame and the pinion is operatively connected with the rotary power means, and wherein the pinion is driven by a hydraulic motor.

Item 5. The rotary drive machine of any one of Items 1-4, wherein the vertical actuator comprises a threaded rod and mating threaded collar, wherein the threaded rod is operatively connected with the frame and the mating threaded collar is operatively connected with the rotary power means, and wherein the threaded rod and/or the mating threaded collar is driven by a hydraulic motor.

Item 6. The rotary drive machine of any one of Items 1-5, wherein the vertical actuator comprises a hydraulic actuator, wherein the hydraulic actuator is operatively connected between the frame and the rotary power means.

Item 7. The rotary drive machine of any one of Items 1-6, wherein the at least one slab anchor comprises at least one detachable anchoring tab extendable from the open lower end of the frame to reach underneath the exterior perimeter of the installation opening in the slab floor, whereby the attachment of said at least one slab anchor will retain the machine in relation to the installation opening in the slab floor and permit downward pressure to be asserted on the rotary power means by the vertical actuator in operation of the machine.

Item 8. The rotary drive machine of any one of Items 1-7, wherein the at least one slab anchor comprises a hydraulic ram to retract and/or extend the anchoring tab.

Item 9. The rotary drive machine of any one of Items 1-8, wherein the at least one slab anchor comprises a threaded rod and mating threaded collar to retract and/or extend the anchoring tab.

Item 10. The rotary drive machine of any one of Items 1-9, wherein the at least one slab anchor comprises at least two anchor bearings extending from the open lower end of the frame, adapted to engage the exterior perimeter of the installation opening in the slab floor and restrain the frame from rotating relative to the slab floor.

Item 11. The rotary drive machine of any one of Items 1-10, further comprising at least one foundation anchor operably connected with the frame.

Item 12. The rotary drive machine of any one of Items 1-11, wherein the vertical movement guide is set at an angle relative to the vertical axis of the frame between about 0 degrees and about ±15 degrees.

Item 13. The rotary drive machine of any one of Items 1-12, wherein an angle of the vertical movement guide is adjustable.

Item 14. The rotary drive machine of any one of Items 1-13, further comprising powered machine movement means, adapted to move and/or manipulate the machine into the building, between operating positions, over the installation opening, and/or out of the building.

Item 15. The rotary drive machine of Item 13, wherein the powered machine movement means comprises at least one powered continuous track.

Item 16. The rotary drive machine of Item 15, wherein the at least one powered continuous track is pivotally attached in proximity to the open lower end of the vertical frame, wherein the machine is movable between a transport position, laid down proximate the powered continuous track and an operating position, substantially vertical and in-between said positions.

Item 17. The rotary drive machine of Item 15 or 16, further comprising a linear actuator extending between a chassis of the powered continuous track and the vertical frame to selectively adjust the angle there-between.

Item 18. A method for installation of a helical pile from an interior of a building foundation having a slab floor therein with an installation opening in the slab floor exposing an installation area of the ground thereunder in close proximity to the desired installation location for the helical pile, said method using a rotary drive machine comprising:
- a. a vertical frame having an upper end and an open lower end for positioning over an installation section of ground in which it is desired to rotationally install at least one helical pile section;
- b. a rotary power means for the rotation and installation of a helical pile section through the open lower end of the frame;
- c. a vertical movement guide slidably engaging the rotary power means, to allow for retention and guidance of the rotary power means therealong;
- d. a vertical actuator operatively attached to the rotary power means, capable of powered movement of the rotary power means along the vertical movement guide as desired; and
- e. at least one slab anchor for engaging and retaining the vertical frame and the lower end thereof in relation to an installation opening in the slab exposing the installation section of ground, wherein the method comprises:
- i. manipulating the open bottom end of the frame and the position over top of the installation opening in the slab;
- ii. anchoring the machine to the outer perimeter of the installation opening using the at least one slab anchor;
- iii. positioning a helical pile section within the frame, engaging the point on the ground thereunder at which it is desired to install the helical pile section;
- iv. attaching an upper end of the helical pile section to the rotary power means;
- v. actuating the rotary power means to rotate the helical pile section and screw it into the ground;
- vi. using the vertical actuator as required to drive the rotary power means and the helical pile section into the ground; and
- vii. once the helical pile section is completely rotationally installed into the ground beneath the slab, detaching the rotary power means therefrom.

Item 19. The method of Item 18, further comprising cutting the installation opening in the slab floor in advance of the anchoring and position of the machine for installation of the helical pile.

Item 20. The method of Item 18 or 19, further comprising resetting the machine for the installation of a multi-section helical pile by:
a. detaching the rotary power means from a first helical pile section having been driven into the ground close to the ground surface;
b. retracting the rotary power means nearer the upper end of the frame using the vertical actuator;
c. placing another helical pile section into the frame and attaching the bottom of said helical pile section to the top of the section exposed and already installed in the ground;
d. attaching the rotary power means to the top of the supplemental helical pile section having been attached; and
e. actuating the rotary power means and the vertical actuator to continue driving the supplemental helical pile section into the ground.

Item 21. The rotary drive machine of any one of Items 1-17, further comprising a hydraulic drive and wherein:
a. the vertical actuator comprises a hydraulic cylinder powered by the hydraulic drive; and
b. the rotary power means is hydraulically powered by the hydraulic drive when actuated.

Item 22. The rotary drive machine of any one of Items 1-17 and 21, further comprising powered machine movement means, which can be used to move and manipulate the machine and in between operating positions.

Item 23. The rotary drive machine of any one of Items 1-17 and 21-22, further comprising hydraulically powered machine movement means, which can be used to move and manipulate the machine to and in between operating positions.

Item 24. The rotary drive machine of Item 23, wherein the powered machine movement means comprises at least one hydraulically powered track.

Item 25. The rotary drive machine of Item 24, wherein the at least one hydraulically powered track is pivotally attached in proximity to the open lower end of the vertical frame, which can by its pivotal attachment laid the machine down for transport against the structure of the at least one hydraulically powered track and can also be used to manipulate the machine up and down stairs and other inclined services and then stand up said machine in its vertical orientation at an operating position Item 26. The rotary drive machine of any one of Items 1-17 and 21-25, wherein the at least one slab anchor comprises at least one detachable anchoring tab extending from the open lower end of the frame to reach underneath the exterior perimeter of the installation opening in the slab, whereby the attachment of said at least one slab anchor will retain the machine in relation to the installation opening in the slab and permit downward pressure to be asserted on the rotary power means by the vertical actuator in operation of the machine.

Item 27. The rotary drive machine of any one of Items 1-17 and 21-26, wherein the vertical movement guide is angled in relation to the vertical axis of the frame, such that a helical pile section is installed will be installed towards one edge of the open bottom end of the frame, allowing the installation of helical pile sections by the machine underneath foundation or slab portions adjacent to an edge of the installation opening.

Item 28. The rotary drive machine of Item 24 or 25, wherein the at least one powered track is pivotally attached in proximity to the open lower end of the vertical frame, which can by its pivotal attachment laid the machine down for transport against the structure of the at least one hydraulically powered track and can also be used to manipulate the machine up and down stairs and other inclined services and then stand up said machine in its vertical orientation at an operating position.

Item 29. The rotary drive machine of any one of Items 1-17 and 21-28, wherein the at least one slab anchor comprises at least one detachable anchoring tab extending from the open lower end of the frame to reach underneath the exterior perimeter of the installation opening in the slab, whereby the attachment of said at least one slab anchor will retain the machine in relation to the installation opening in the slab and permit downward pressure to be asserted on the rotary power means by the vertical actuator in operation of the machine.

Item 30. The rotary drive machine of any one of Items 1-17 and 21-29, wherein the vertical movement guide is angled in relation to the vertical axis of the frame, such that a helical pile section as installed will be installed towards one edge of the open bottom end of the frame, allowing the installation of helical pile sections by the machine underneath foundation or slab portions adjacent to an edge of the installation opening.

It will be apparent to those of skill in the art that by routine modification the present disclosure can be optimized for use in a wide range of conditions and application. It will also be obvious to those of skill in the art that there are various ways and designs with which to produce the apparatus and methods of the present disclosure. The illustrated embodiments are therefore not intended to limit the scope of the disclosure, but to provide examples of the apparatus and method to enable those of skill in the art to appreciate the inventive concept.

In an embodiment disclosed, the present disclosure provides a rotary drive machine for the installation of helical pile sections through installation openings in a slab floor inside of a building perimeter. A vertical frame having an upper end and an open lower end is positioned over an installation opening through which it is desired to rotationally install a helical pile section, and the vertical frame anchored to the slab floor. A rotary power means, attached to the helical pile section moves along a vertical movement guide and is driven by a vertical actuator to rotationally and vertically drive the helical section into the ground. A method of use is also disclosed.

Those skilled in the art will recognize that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. The terms "comprises" and "comprising" should be interpreted as referring to elements, components, or steps in a non-exclusive manner, indicating that the referenced elements, components, or steps may be present, or utilized, or combined with other elements, components, or steps not expressly referenced.

The invention claimed is:

1. A rotary drive machine for the installation of helical piles from inside a perimeter of a building foundation having a slab floor therein, said machine comprising:
a. a vertical frame having an upper end and an open lower end for positioning over an installation opening in the slab floor through which an installation section of ground in which it is desired to rotationally install at least one helical pile section is exposed;

b. a rotary power means for the rotation and installation of the at least one helical pile section through the open lower end of the frame;

c. a vertical movement guide slidably engaging the rotary power means, to allow for retention and guidance of the rotary power means therealong;

d. a vertical actuator operatively attached to the rotary power means, capable of powered movement of the rotary power means along the vertical movement guide as desired; and at least one slab anchor for engaging and retaining the vertical frame and the lower end thereof in relation to the installation opening in the slab floor exposing the installation section of ground thereunder, at a desired operating position for the machine, wherein the at least one slab anchor comprises at least one detachable anchoring tab extendable from the open lower end of the frame to reach underneath the exterior perimeter of the installation opening in the slab floor, whereby the attachment of said at least one slab anchor will retain the machine in relation to the installation opening in the slab floor and permit downward pressure to be asserted on the rotary power means by the vertical actuator in operation of the machine.

2. The rotary drive machine of claim 1, wherein the rotary power means and/or the vertical actuator are hydraulic.

3. The rotary drive machine of claim 2, wherein the rotary power means and/or the vertical actuator comprise a hydraulic motor.

4. The rotary drive machine of claim 2, wherein the vertical actuator comprises a rack and pinion, wherein the rack is operatively connected with the frame and the pinion is operatively connected with the rotary power means.

5. The rotary drive machine of claim 4, wherein the pinion is driven by a hydraulic motor.

6. The rotary drive machine of claim 2, wherein the vertical actuator comprises a threaded rod and mating threaded collar, wherein the threaded rod is operatively connected with the frame and the mating threaded collar is operatively connected with the rotary power means, and wherein the threaded rod and/or the mating threaded collar is driven by a hydraulic motor.

7. The rotary drive machine of claim 1, wherein the vertical actuator comprises a hydraulic actuator, wherein the hydraulic actuator is operatively connected between the frame and the rotary power means.

8. The rotary drive machine of claim 1, wherein the at least one slab anchor comprises a hydraulic ram to retract and/or extend the anchoring tab.

9. The rotary drive machine of claim 1, wherein the at least one slab anchor comprises a threaded rod and mating threaded collar to retract and/or extend the anchoring tab.

10. The rotary drive machine of claim 1, wherein the at least one slab anchor comprises at least two anchor bearings extending from the open lower end of the frame, adapted to engage the exterior perimeter of the installation opening in the slab floor and restrain the frame from rotating relative to the slab floor.

11. The rotary drive machine of claim 1, further comprising at least one foundation anchor operably connected with the frame.

12. The rotary drive machine of claim 1, wherein the vertical movement guide is set at an angle relative to the vertical axis of the frame between about 0 degrees and about ±15 degrees.

13. The rotary drive machine of claim 1, further comprising powered machine movement means, adapted to move and/or manipulate the machine into the building, between operating positions, over the installation opening, and/or out of the building.

14. The rotary drive machine of claim 13, wherein the powered machine movement means comprises at least one powered continuous track.

15. The rotary drive machine of claim 14, wherein the at least one powered continuous track is pivotally attached in proximity to the open lower end of the vertical frame, wherein the machine is movable between a transport position, laid down proximate the powered continuous track and an operating position, substantially vertical and in-between said positions.

16. The rotary drive machine of claim 15, further comprising a linear actuator extending between a chassis of the powered continuous track and the vertical frame to selectively adjust the angle there-between.

17. The rotary drive machine of claim 1, wherein the vertical actuator comprises an electric actuator.

18. A rotary drive machine for the installation of helical piles from inside a perimeter of a building foundation having a slab floor therein, said machine comprising:

a. a vertical frame having an upper end and an open lower end for positioning over an installation opening in the slab floor through which an installation section of ground in which it is desired to rotationally install at least one helical pile section is exposed;

b. a rotary power means for the rotation and installation of the at least one helical pile section through the open lower end of the frame;

c. a vertical movement guide slidably engaging the rotary power means, to allow for retention and guidance of the rotary power means therealong;

d. a vertical actuator operatively attached to the rotary power means, capable of powered movement of the rotary power means along the vertical movement guide as desired; and at least one slab anchor for engaging and retaining the vertical frame and the lower end thereof in relation to the installation opening in the slab floor exposing the installation section of ground thereunder, at a desired operating position for the machine, wherein an angle of the vertical movement guide is adjustable.

19. A method for installation of a helical pile from an interior of a building foundation having a slab floor therein with an installation opening in the slab floor exposing an installation area of the ground thereunder in close proximity to the desired installation location for the helical pile, said method using a rotary drive machine comprising:

a. a vertical frame having an upper end and an open lower end for positioning over an installation section of ground in which it is desired to rotationally install at least one helical pile section;

b. a rotary power means for the rotation and installation of a helical pile section through the open lower end of the frame;

c. a vertical movement guide slidably engaging the rotary power means, to allow for retention and guidance of the rotary power means therealong;

d. a vertical actuator operatively attached to the rotary power means, capable of powered movement of the rotary power means along the vertical movement guide as desired; and e. at least one slab anchor for engaging and retaining the vertical frame and the lower end thereof in relation to an installation opening in the slab exposing the installation section of ground, wherein the method comprises:
  i. manipulating the open bottom end of the frame and the position over top of the installation opening in the slab;
  ii. anchoring the machine to the outer perimeter of the installation opening using the at least one slab anchor;
  iii. positioning a helical pile section within the frame, engaging the point on the ground therebeneath at which it is desired to install the helical pile section;
  iv. attaching an upper end of the helical pile section to the rotary power means;
  v. actuating the rotary power means to rotate the helical pile section and screw it into the ground;
  vi. using the vertical actuator as required to drive the rotary power means and the helical pile section into the ground; and
  vii. once the helical pile section is completely rotationally installed into the ground beneath the slab, detaching the rotary power means therefrom.

20. The method of claim 19, further comprising cutting the installation opening in the slab floor in advance of the anchoring and position of the machine for installation of the helical pile.

21. The method of claim 19, further comprising resetting the machine for the installation of a multi-section helical pile by:
  a. detaching the rotary power means from a first helical pile section having been driven into the ground close to the ground surface;
  b. retracting the rotary power means nearer the upper end of the frame using the vertical actuator;
  c. placing another helical pile section into the frame and attaching the bottom of said helical pile section to the top of the section exposed and already installed in the ground;
  d. attaching the rotary power means to the top of the supplemental helical pile section having been attached; and
  e. actuating the rotary power means and the vertical actuator to continue driving the supplemental helical pile section into the ground.

* * * * *